(12) United States Patent
Kajino et al.

(10) Patent No.: US 11,142,099 B2
(45) Date of Patent: Oct. 12, 2021

(54) LIFTER DEVICE

(71) Applicant: TOYOTA BOSHOKU KABUSHIKI KAISHA, Aichi-ken (JP)

(72) Inventors: Yusuke Kajino, Aichi-ken (JP); Yasuaki Suzuki, Aichi-ken (JP); Masataka Iwata, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 44 days.

(21) Appl. No.: 16/807,542

(22) Filed: Mar. 3, 2020

(65) Prior Publication Data

US 2020/0282873 A1 Sep. 10, 2020

(30) Foreign Application Priority Data

Mar. 8, 2019 (JP) .............................. JP2019-042314

(51) Int. Cl.
*B60N 2/16* (2006.01)
(52) U.S. Cl.
CPC ........... *B60N 2/1685* (2013.01); *B60N 2/165* (2013.01); *B60N 2/1615* (2013.01)
(58) Field of Classification Search
None
See application file for complete search history.

(56) References Cited

U.S. PATENT DOCUMENTS

| 2017/0240069 | A1 | 8/2017 | Asai et al. | |
| 2018/0345826 | A1* | 12/2018 | Mikasa | F16D 41/066 |
| 2020/0284330 | A1* | 9/2020 | Kajino | F16H 31/002 |
| 2020/0398706 | A1* | 12/2020 | Suzuki | B60N 2/167 |
| 2021/0122264 | A1* | 4/2021 | Kajino | B60N 2/165 |
| 2021/0129713 | A1* | 5/2021 | Kajino | B60N 2/1685 |
| 2021/0146805 | A1* | 5/2021 | Suzuki | F16D 41/16 |
| 2021/0207665 | A1* | 7/2021 | Mikasa | B60N 2/1615 |
| 2021/0221261 | A1* | 7/2021 | Mikasa | B60N 2/1615 |

FOREIGN PATENT DOCUMENTS

JP 2016-78850 5/2016

* cited by examiner

*Primary Examiner* — David E Allred
(74) *Attorney, Agent, or Firm* — Greenblum & Bernstein P.L.C.

(57) ABSTRACT

A lifter device includes: an output shaft; a support member supporting the output shaft; an input member coupled to an operation handle; a feed portion transmitting forward and reverse rotation of the input member to the output shaft; a lock portion locking the rotation of the output shaft; and a friction generating portion applying a frictional force to the rotation of the output shaft. A rotating cam of the friction generating portion is a switching structure of switching to: a friction-suppression state when the operation handle is in a neutral position and when the operation handle is turned from the neutral position in a direction of raising the seat; and a friction-on state when the operation handle is turned from the neutral position in a direction of lowering the seat. In the friction-on state, a rotating member is pressed against a fixed member and friction is generated.

3 Claims, 39 Drawing Sheets

LIFTER DEVICE

CROSS-REFERENCE TO RELATED APPLICATIONS

This application claims priority from Japanese Patent Application No. 2019-042314 filed on Mar. 8, 2019, the entire contents of which are incorporated herein by reference.

TECHNICAL FIELD

The present disclosure relates to a lifter device. Specifically, the present disclosure relates to a lifter device including an output shaft configured to rotate by receiving rotational power transmitted from an operation handle and configured to raise and lower a seat.

BACKGROUND

There has been a vehicle seat including a lifter device capable of adjusting a seat surface height of a seat cushion as disclosed in JP-A-2016-78850. Specifically, when the operation handle is operated such that the operation handle is raised and lowered, the lifter device transmits a movement amount of the operation as a feeding rotation movement amount of a gear, and raises and lowers the seat surface height by a certain amount. When the operation of the operation handle is released, the lifter device is configured such that the rotation of the gear is locked at that position, and such that the operation handle is returned to the neutral position, at which the operation handle is positioned before the operation, by urging and is returned to an initial state in which the operation can be performed again.

The feeding rotation of the gear accompanying the operation of the operation handle is performed by pushing a feed pawl meshed with the gear in an operation direction of the operation handle. Further, the rotation of the gear during the release of the operation of the operation handle is locked as follows. That is, a pair of lock pawls, which is configured by a pair of symmetrical structures meshed with the gear, is a ratchet type meshing structure. The ratchet type meshing structure is that one lock pawl of the pair of lock pawls is disengaged in accordance with the operation of the operation handle, and that the other lock pawl of the pair of lock pawls releases rotation in a feed direction but meshes with the gear in a reverse direction. When the operation of the operation handle is released, the other lock pawl stops the rotation of the gear at that position.

The feed pawl, which performs the feeding rotation of the gear, is a pair of symmetrical pawl structures similarly to the lock pawl so as to allow the movement of returning to the neutral position when the operation of the operation handle is released. The pair of feed pawls is the ratchet type meshing structure such that one feed pawl of the pair of feed pawls is disengaged from the gear in accordance with the operation of the operation handle, and such that the other feed pawl of the pair of feed pawls meshes with the gear so as to transmit the power in the feed direction but releases rotation in the reverse direction. A disc spring capable of applying a sliding frictional resistance force is provided between the gear and a support member supporting the gear such that the gear does not slide and rotate due to a load acting in the direction of gravity when the operation handle is pushed down.

In the related art disclosed in JP-A-2016-78850, the disc spring is configured to apply the sliding frictional resistance force between the gear and the support member at any time. For this reason, the sliding frictional resistance force is also applied during the pulled-up operation of the operation handle, which does not cause the slip rotation of the gear, and thus, an operation load is increased. The disclosure has been made to solve the above problem, and the problem to be solved by the disclosure is to prevent sliding rotation during the pushed-down operation and to ensure that the rotation can be locked at the neutral position without increasing an operation load during the pulled-up operation of the operation handle.

SUMMARY

In order to solve the above problems, a lifter device of the present disclosure takes the following solutions.

The lifter device of the present disclosure includes:
an output shaft configured to rotate by receiving transmission of rotational power from an operation handle and configured to raise and lower a seat;
a support member configured to support the output shaft such that the output shaft is rotatable;
an input member coupled to the operation handle and configured to be operated to rotate around an axis of the output shaft;
a feed portion configured to transmit forward and reverse rotation of the input member to the output shaft;
a lock portion configured to lock the rotation of the output shaft with respect to the support member; and
a friction generating portion configured to apply a frictional force to the rotation of the output shaft, the friction generating portion including:
an elastic body provided between the output shaft and the support member;
a rotating cam connected to the input member;
a rotating member configured to rotate integrally with the output shaft;
a clutch portion configured to be supported by the support member, configured to be pushed in a radial direction by rotation of the rotating cam, and configured to press the elastic body in a thrust direction between the clutch portion and the rotating member to generate friction; and
a fixed member configured to be supported by the support member and arranged with the rotating member in the thrust direction,
the rotating cam is a switching structure of switching to:
a friction-suppression state, in which generation of friction caused by the elastic body is suppressed, by not pushing the clutch portion in the radial direction when the operation handle is in a neutral position and when the operation handle is turned from the neutral position in a direction of raising the seat; and
a friction-on state, in which friction caused by the elastic body is generated, by pushing the clutch portion in the radial direction when the operation handle is turned from the neutral position in a direction of lowering the seat, and
in the friction-on state, the rotating member is pressed against the fixed member and friction caused by rotation of the rotating member with respect to the fixed member is generated.

DETAILED DESCRIPTION

Hereinafter, embodiments for carrying out the present disclosure will be described with reference to drawings.

First Embodiment

Figure 1:
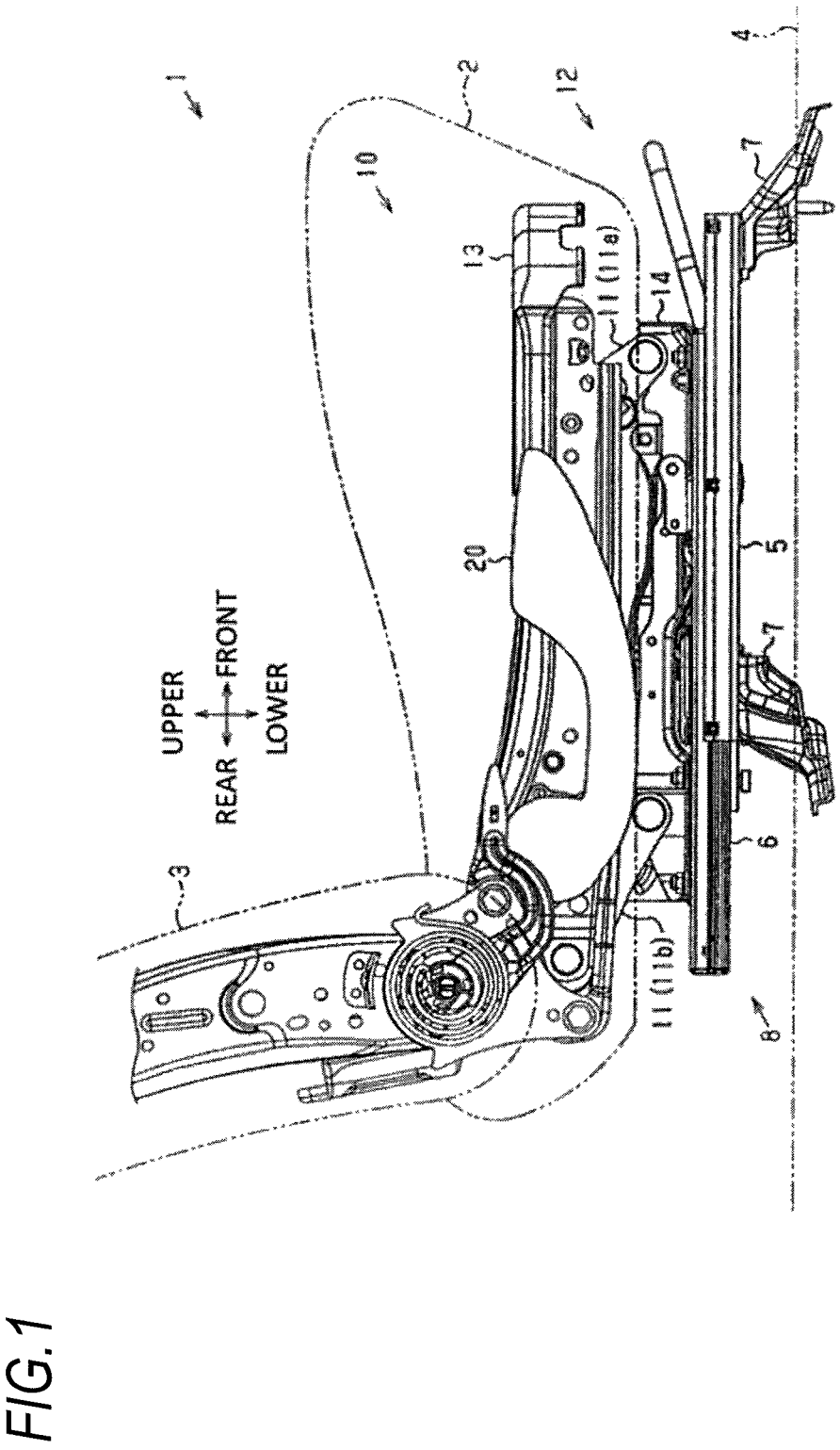
FIG. 1 is an outer side view showing a schematic configuration of a lifter device according to a first embodiment.
Figure 2:
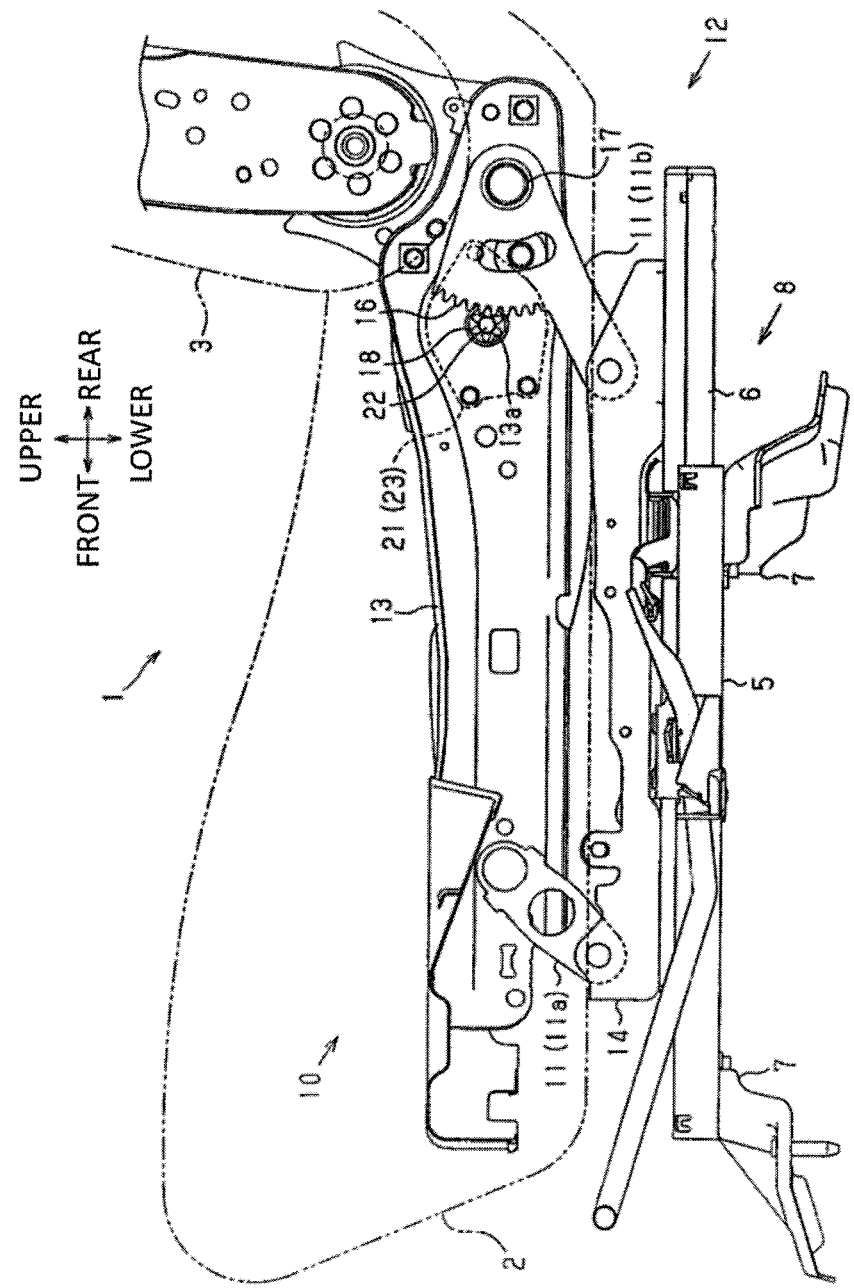
FIG. 2 is a side view of an outer side structure as viewed from an inner side of a seat.
Figure 3:
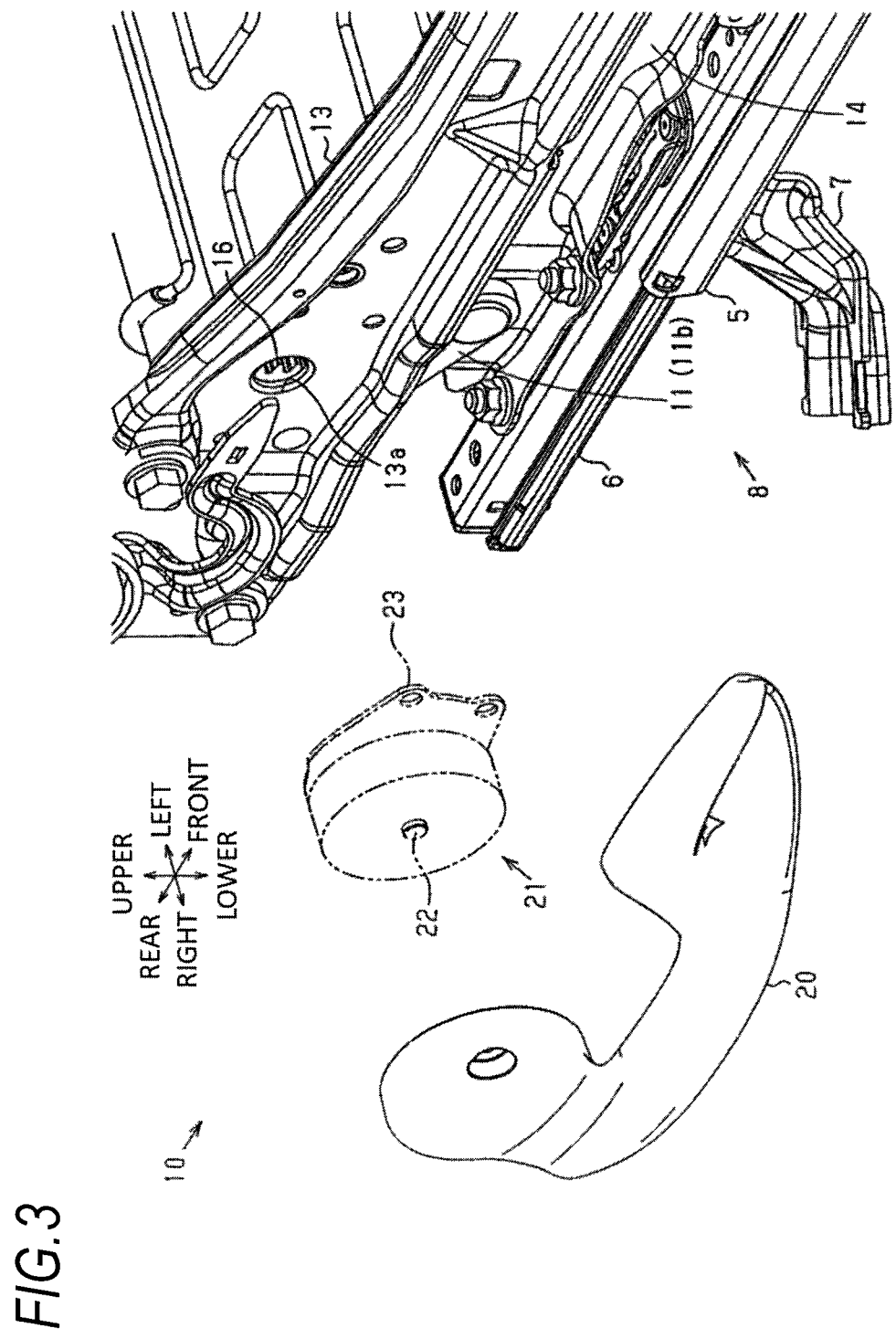
FIG. 3 is an exploded perspective view showing a state in which an operation handle and a rotation control device are removed from a seat frame.

FIGS. 1 to 3 show a seat 1 for an automobile to which a lifter device 10 according to the first embodiment of the present disclosure is applied. In the drawings, directions of portions in a state in which the seat 1 is mounted on the automobile are indicated by arrows. In the following description, description relating to directions is made based on these directions.

<Schematic Configuration of Lifter Device 10>

As shown in FIG. 1, the seat 1 includes a seat back 3 serving as a backrest on a rear side of a seat cushion 2 serving as a seating part. The seat back 3 is connected to the seat cushion 2 such that a backrest angle is adjustable in a front-rear direction. The seat cushion 2 includes a lifter device 10 and a seat slide device 8 at a lower part of the seat cushion 2. The seat cushion 2 is fixed to a floor 4 of a vehicle via a bracket 7.

As shown in FIG. 2, the seat slide device 8 is known in the related art. The seat slide device 8 includes a pair of left and right upper rails 6 coupled to a pair of left and right lower rails 5 extending in the front-rear direction so as to be slidable forward and rearward. The left and right lower rails 5 are fixedly supported by a pair of front and rear brackets 7 fixed to the floor 4, respectively. The lifter device 10 is provided above the left and right upper rails 6.

As shown in FIGS. 2 and 3, the lifter device 10 includes support brackets 14 fixed on the upper rails 6 and a plurality of link members 11 rotatably coupled to front and rear end parts of the upper rails 6. A side frame 13 that is a framework of the seat cushion 2, the support bracket 14, and the link members 11 constitute a link mechanism 12 that is a four-bar linkage. Among the plurality of link members 11, a rear link 11b on a right rear side includes a sector gear 16 and is configured to be rotated in the front-rear direction via a pinion gear 18 of a rotation control device 21. A rotation shaft of the rear link 11b on the right rear side with respect to the side frame 13 is configured by a torque rod 17. A rear link (not illustrated) on a left rear side is also configured to be rotated in synchronization with the rear link 11b via the torque rod 17.

A through hole 13a for inserting the pinion gear 18 is formed in the side frame 13. The rotation control device 21 is fixed to a right wall of the side frame 13 such that the pinion gear 18 is inserted into the through hole 13a. The rotation control device 21 is rotatably operated in forward and reverse directions by an operation handle 20 provided on a right side of the seat cushion 2 and extending in the front-rear direction. When the operation handle 20 is rotated upward from a neutral position, the rotation control device 21 is rotated in a direction in which the rear link 11b is raised from the support bracket 14. When the operation handle 20 is rotated downward from the neutral position, the rotation control device 21 is rotated in a direction in which the rear link 11b is laid down on the support bracket 14. With the configuration of the above four-bar linkage, a front link 11a is also rotated in response to the rotation of the rear link 11b, so that a height position of the seat cushion 2 with respect to the floor 4 is adjusted in response to the operation of the operation handle 20.

<Configuration of Rotation Control Device 21>

Figure 4:
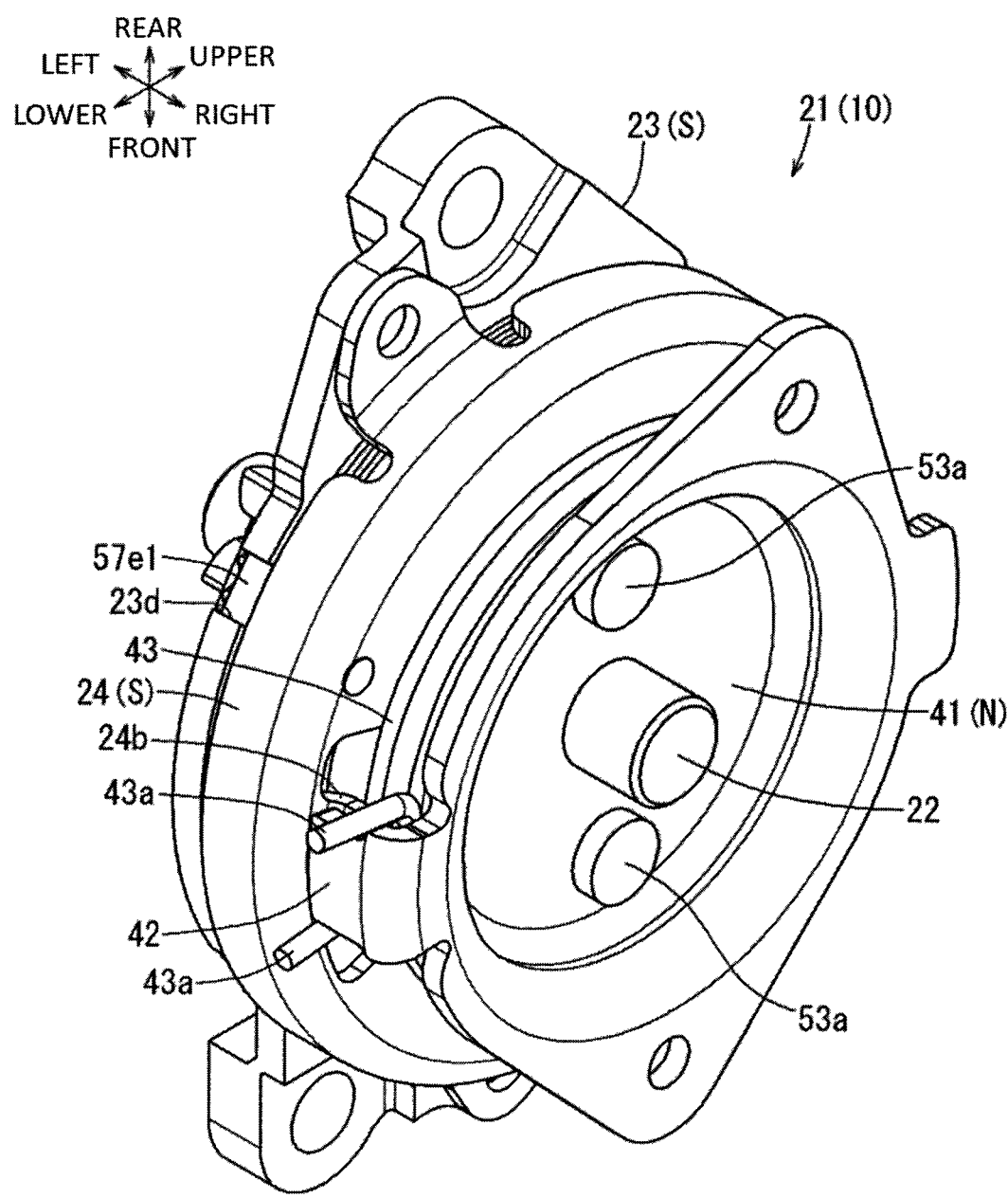
FIG. 4 is a perspective view of the rotation control device as viewed from an outer side of the seat.
Figure 5:
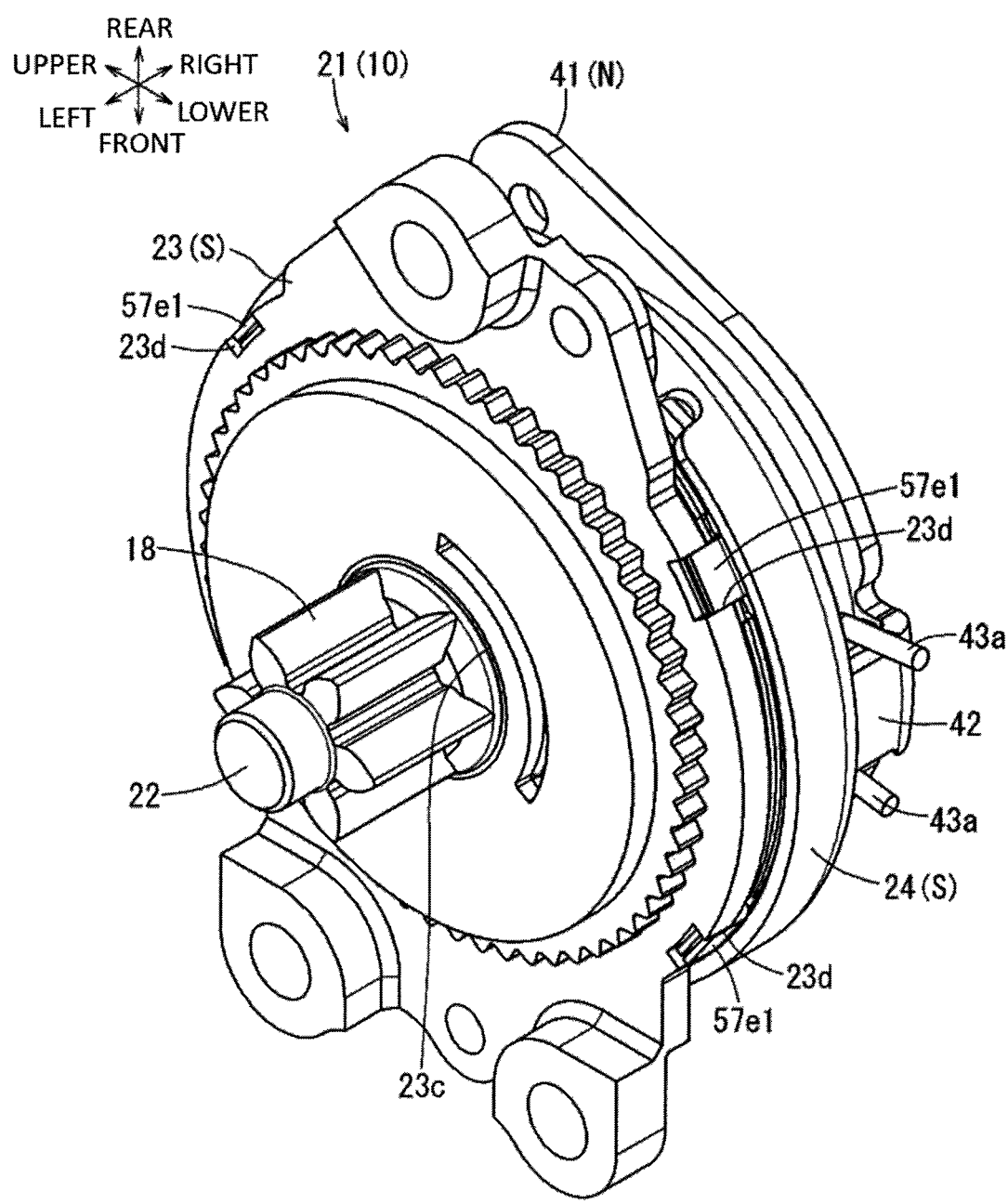
FIG. 5 is a perspective view of the rotation control device as viewed from the inner side of the seat.
Figure 6:
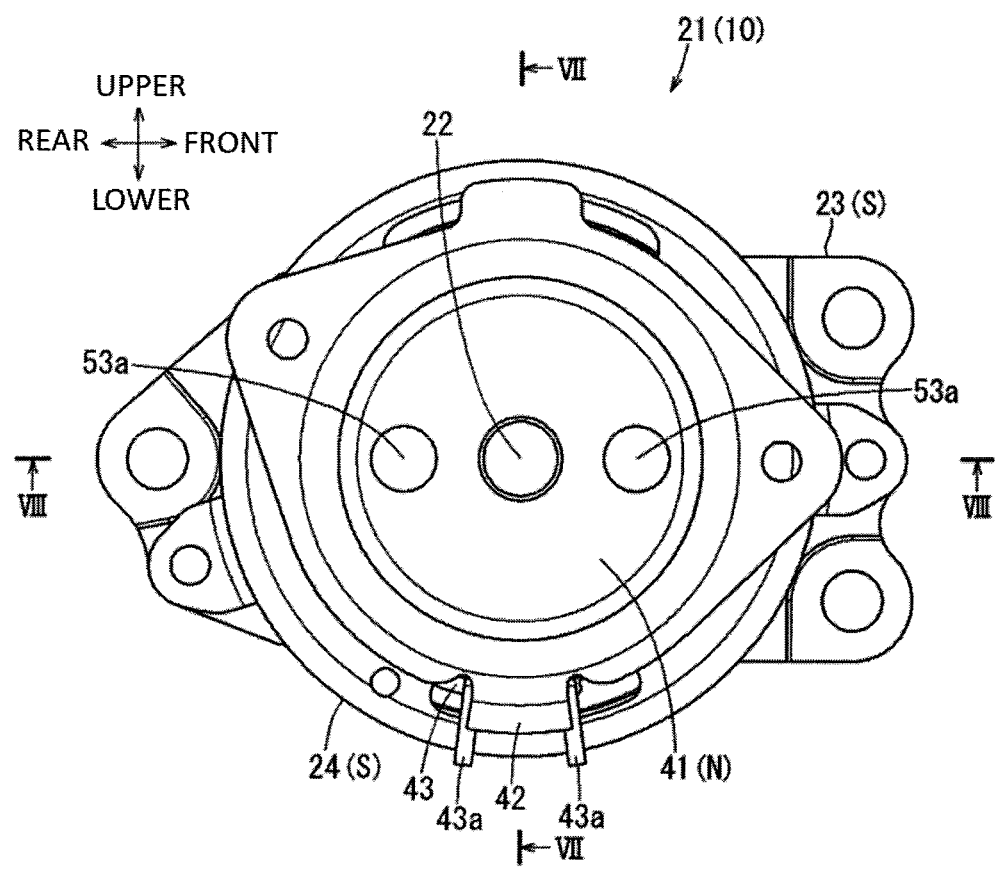
FIG. 6 is a front view of the rotation control device as viewed from the outer side of the seat.
Figure 7:
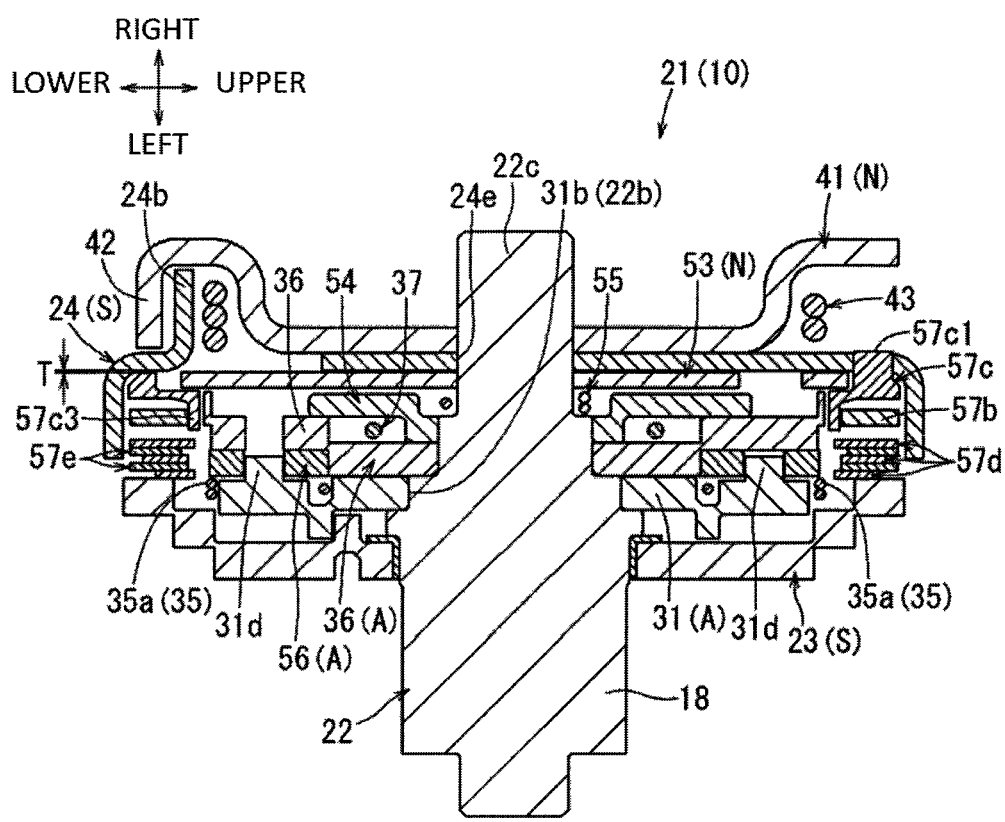
FIG. 7 is a cross-sectional view taken along a line VII-VII in FIG. 6.
Figure 8:
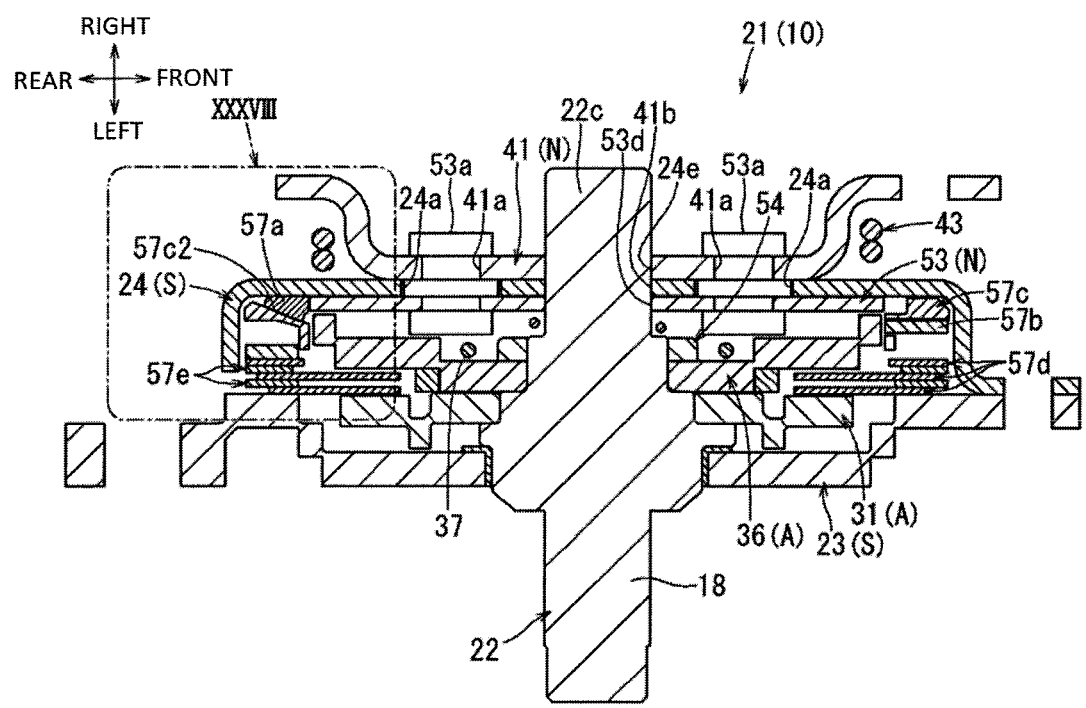
FIG. 8 is a cross-sectional view taken along a line VIII-VIII in FIG. 6.

FIGS. 4 to 6 show a state in which the rotation control device 21 is detached from the seat cushion 2. Hereinafter, the configuration of the rotation control device 21 is described with reference to FIGS. 4 to 15. For the reference numerals of the constituent members of the rotation control device 21 to be described below, reference will be made to any of FIGS. 4 to 15 as appropriate.

The rotation control device 21 is assembled such that an output shaft 22 penetrates through a center hole 23c of a base 23 serving as a support member from a right side, and such that the pinion gear 18 protrudes from a left side surface of the base 23. The base 23 is fixed to the side frame 13 in a state in which the pinion gear 18 penetrates through the through hole 13a of the side frame 13.

A right side surface of the base 23 is formed into a circular container shape as a whole by punching at left side to form a guide recessed portion 23b so as to accommodate a disc-shaped rotating plate 31. Internal teeth 34 are formed on an inner peripheral surface of the guide recessed portion 23b to mesh with four pawls 32, 33 to-be-described below. A spline hole 31b is formed at the center of the rotating plate 31 and fitted to a spline 22b formed on the output shaft 22. Therefore, the rotating plate 31 is rotated in synchronization with the output shaft 22.

On an outer peripheral part of a right side surface of the rotating plate 31, two protrusions 31d are formed on an upper side and a lower side, respectively, and each protrusion 31d protrudes in a pin shape. Two pairs of upper and lower protrusions 31e (i.e. a total of four) are formed on a front side and a rear side, respectively, and each protrusion 31e protrudes in a pin shape. The protrusions 31e are rotatably fitted into through holes 32a, 33a of the pawls 32, 33. The pawls 32, 33 are swingable about the protrusions 31e. Winding portions 35a of torsion springs 35 are fitted to the protrusions 31d. Each end portion 35b of the torsion springs 35 is engaged with each of the pawls 32, 33, and urges each of the pawls 32, 33 toward an outer peripheral side of the rotating plate 31. For this reason, engaging end portions 32c, 33c forming external teeth of the pawls 32, 33 are always meshed with the internal teeth 34 of the base 23.

A plate-shaped outer lever 41 constitutes an outer side member of an input member N having an inner and outer double-structure. The plate-shaped outer lever 41 is coupled to the operation handle 20 and rotationally operated. The plate-shaped outer lever 41 is provided on a right side surface of a cover 24. The cover 24 is formed in a container shape that bulges rightward as a whole. A round bar-shaped end portion 22c forming a right end portion of the output shaft 22 penetrates through a through hole 24e in the center of the cover 24 and is inserted into a center hole 41b of the outer lever 41 from the left side. By the insertion, the outer lever 41 is supported so as to be rotatable around the end portion 22c of the output shaft 22 with respect to the cover 24. A plate-shaped inner lever 53 constitutes an inner side member of the input member N. A pair of stopper pins 53a protrude in a right direction (thrust direction) from the plate-shaped inner lever 53. The pair of stopper pins 53a are inserted from the left side into a pair of arc-shaped through holes 24a formed in the cover 24 and a pair of round-hole-shaped through holes 41a formed in the outer lever 41.

Each of the pair of stopper pins 53a is inserted into the inner lever 53 from the right direction and is integrally crimped. Each of the pair of stopper pins 53a is passed through the corresponding through hole 24a of the cover 24 from the left side. Each of the pair of stopper pins 53a is inserted into corresponding through hole 41a of the outer lever 41 that is set in a superposed manner on the right side surface of the cover 24, and is integrally coupled to the outer lever 41.

By the above-described coupling, the inner lever 53 and the outer lever 41 are integrally assembled in a state in which the inner lever 53 and the outer lever 41 are rotatable around the output shaft 22 with respect to the cover 24. At a lower portion of the outer lever 41, an engaging piece 42 which is bent to the left side is formed. The engaging piece 42 is arranged on an outer peripheral side of an engaging piece 24b cut and raised to the right side from the lower part of the cover 24.

Each end portion 43a of a ring-shaped torsion spring 43 is hooked between the engaging pieces 42 and 24b. For this reason, when the outer lever 41 is rotated by the operation handle 20, the engaging piece 42 moves so as to be separated from the engaging piece 24b in a rotational direction. When the rotation operation is released, by an urging force of the torsion spring 43, the engaging piece 42 and the engaging piece 24b return to a state of overlapping each other in the rotational direction, and the outer lever 41 is returned to the neutral position at which the outer lever 41 is positioned before the rotation operation.

Further, on the left side of the cover 24, the inner lever 53 and a temporary holding member 54 are provided so as to be accommodated in the container shape of the cover 24. The cover 24 sandwiches these components together with the rotating plate 31 and a rotation transmission plate 36, and is fixed to the base 23. At this time, leg portions 24d of the cover 24 are fixed to through holes 23a of the base 23 by rivets (not shown).

Rising-up portions 24c protruding leftward are formed at two front-rear places on an upper portion of the cover 24. The rising-up portion 24c is formed by cutting and raising a partial region of the cover 24 from the inner peripheral side to the left side. The rising-up portions 24c are formed in a curved plate shape that is curved in an arc of the same circle drawn around the center of the cover 24. As to be described below in FIGS. 18 and 24, when the inner lever 53 is turned clockwise (see FIG. 18) or counterclockwise (see FIG. 24) by the operation of the operation handle 20, these rising-up portions 24c function such that one of the pair of feed pawls 52 attached to the inner lever 53, which does not perform the feed function, ride onto the rising-up portion 24c and the feed pawl 52 moves out of mesh with internal teeth 51 of the rotation transmission plate 36.

As shown in FIGS. 34 to 37, the temporary holding member 54 is set on a right side surface of the rotation transmission plate 36 to-be-described-below. Temporary holding member 54 holds the pair of feed pawls 52 and a torsion spring 55 in a state in which the pair of feed pawls 52 and the torsion spring 55 are positioned with respect to the rotation transmission plate 36. The torsion spring 55 is urged in the direction of meshing these feed pawls 52 with the internal teeth 51 of the rotation transmission plate 36. The internal teeth 51 of the rotation transmission plate 36 and the internal teeth 34 of the base 23 have the same number of teeth.

Figure 34:
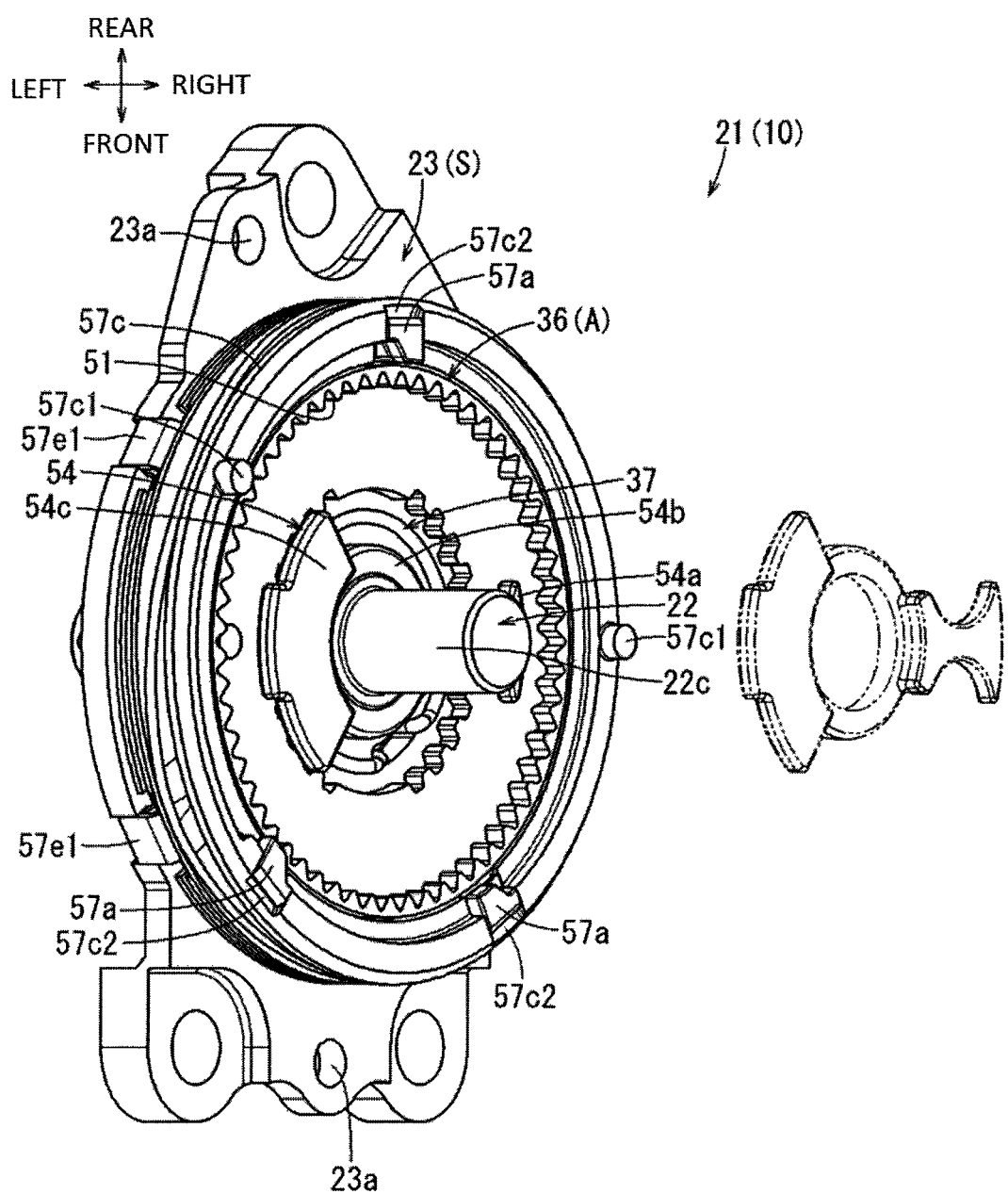
FIG. 34 is a diagram showing a state in which a temporary holding member is set on a rotating plate.

As shown in FIG. 34, a cylindrical shaft support portion 54b formed at a central part of the temporary holding member 54 is passed through the end portion 22c on a right side of the output shaft 22 that is passed through a center hole 36d of the rotation transmission plate 36 from the left side, and thus the cylindrical shaft support portion 54b is set on the right side surface of the rotation transmission plate 36. With this set, the temporary holding member 54 is supported to be rotatable around the end portion 22c of the output shaft 22 with respect to the rotation transmission plate 36.

The temporary holding member 54 further includes a feed pawl holding portion 54a protruding radially outward from a partial region in a rotational direction of the shaft support portion 54b. The temporary holding member 54 holds the pair of feed pawls 52 on respective side surfaces in a rotational direction of the feed pawl holding portion 54a protruding radially outward. Specifically, the feed pawl holding portion 54a includes a pair of rotation receiving surfaces 54a1 recessed in a concave curved shape on side surfaces in the rotational direction of the feed pawl holding portion 54a.

Figure 35:
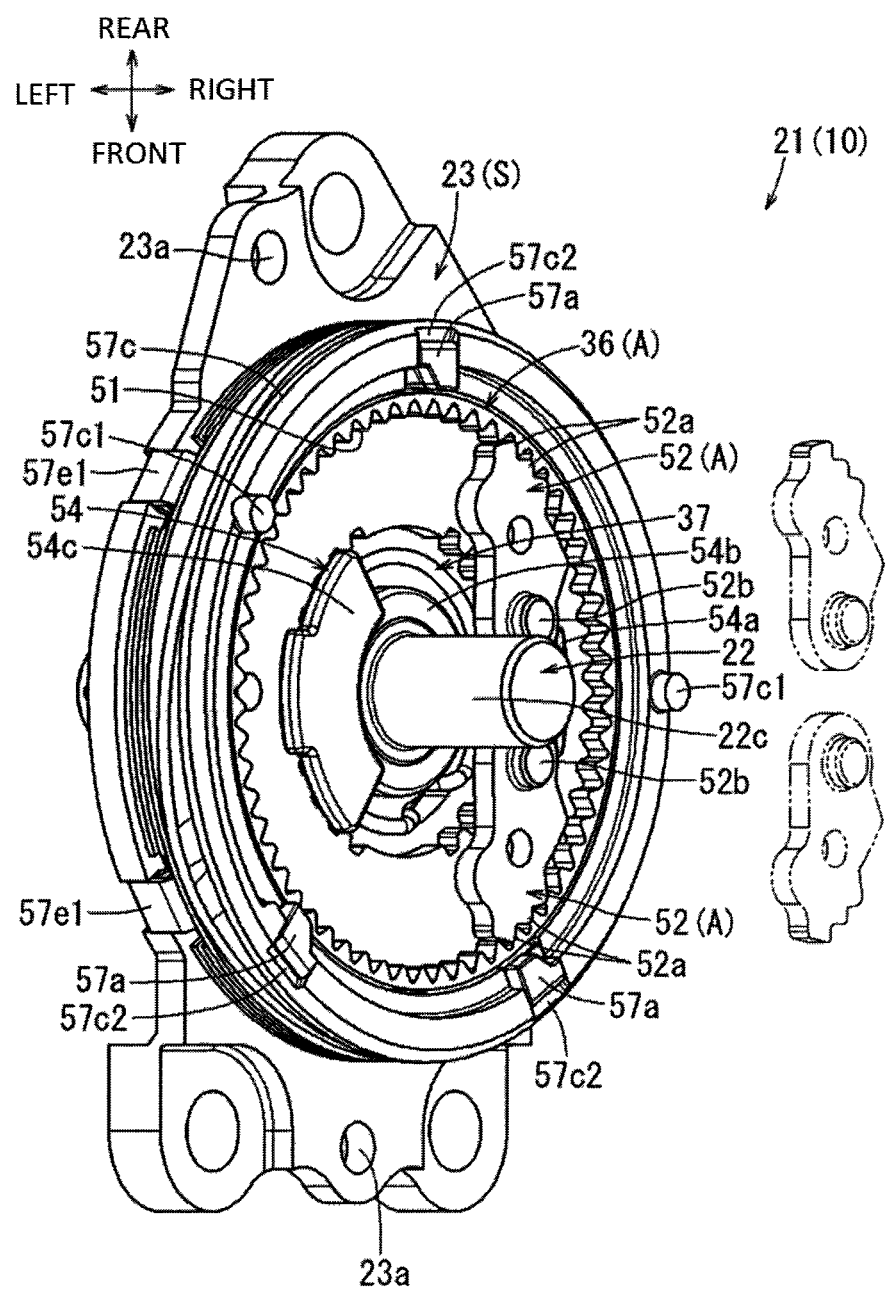
FIG. 35 is a diagram showing a state in which a feed pawl is set between the temporary holding member and the rotating plate.

The feed pawl holding portion 54a applies the outer peripheral surface on a hinge portion 52b side of each feed pawl 52 to each rotation receiving surface 54a1 recessed in the concave curved surface shape, and guides each feed pawl 52 to slide and rotate radially inward and outward along a concave curved surface of each rotation receiving surface 54a1 (see FIG. 35). Specifically, each feed pawl 52 is set in a state in which an outer peripheral surface of an arc shape curved around the hinge portion 52b thereof is applied to each rotation receiving surface 54a1, and is guided so as to be capable of sliding and rotating radially inward and outward around the hinge portion 52b which is the rotation center thereof along each rotation receiving surface 54a1 (each feed pawl 52).

Figure 36:
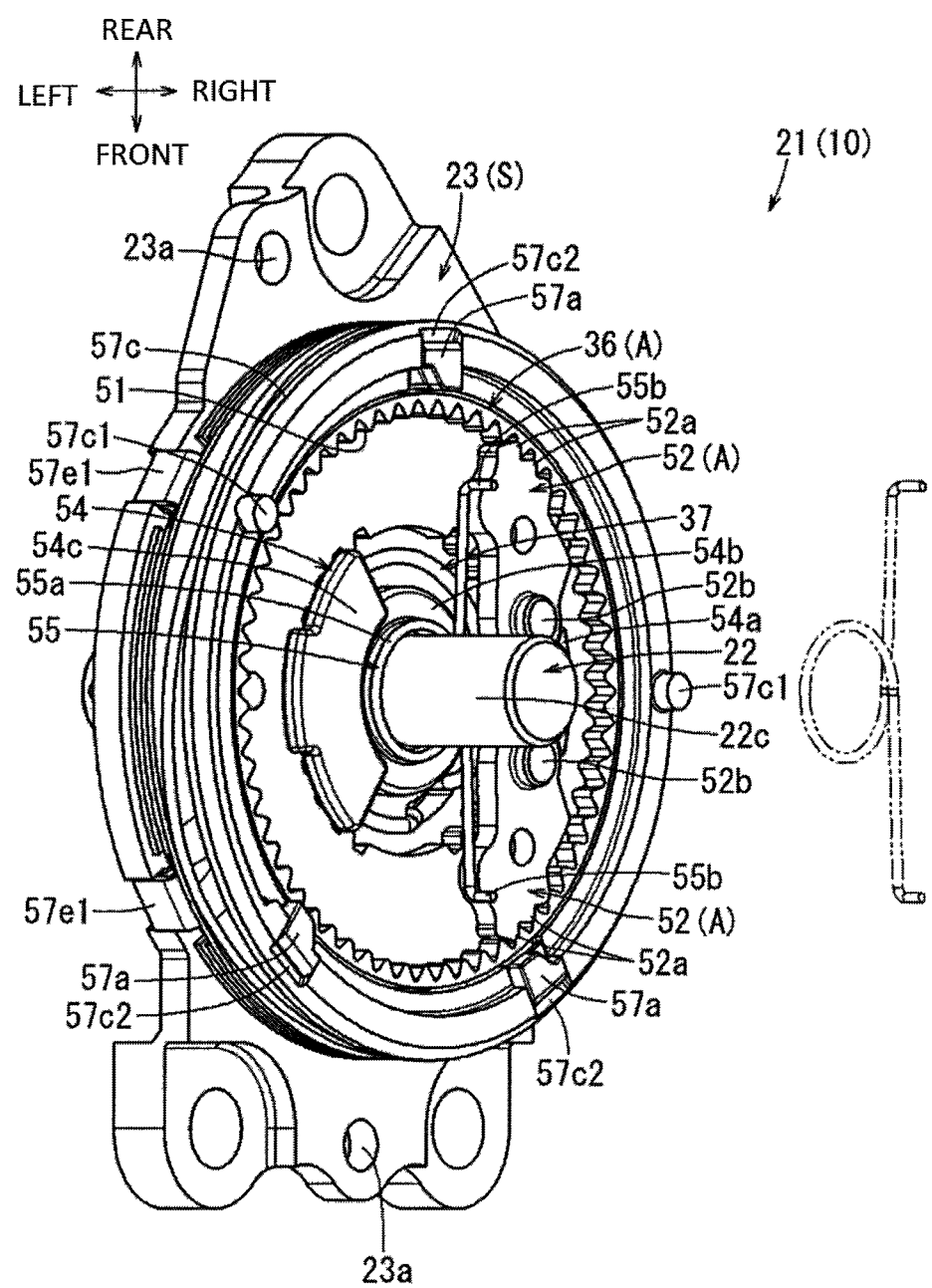
FIG. 36 is a diagram showing a state in which a spring is set between the feed pawl and the pinion gear.

Therefore, after setting the pair of feed pawls 52 on the respective rotation receiving surfaces 54a1 of the temporary holding member 54, by sliding and rotating the pair of feed pawls 52 radially outward along respective rotation receiving surfaces 54a1, the pair of feed pawls 52 can be set in a state in which engaging end portions 52a forming external teeth thereof are meshed with the internal teeth 51 of the rotation transmission plate 36. Then, after the setting, as shown in FIG. 36, by applying the torsion spring 55 between the end portion 22c of the output shaft 22 through which the shaft support portion 54b of the temporary holding member 54 is passed and the pair of feed pawls 52, the pair of feed pawls 52 can be pressed against the internal teeth 51 of the rotation transmission plate 36 by a spring urging force of the torsion spring 55 and can be held in a state of being meshed with the internal teeth 51.

In the torsion spring 55, a winding portion 55a wound in a circular shape at the center thereof is passed through the end portion 22c of the output shaft 22, and end portions 55b extending from the winding portion 55a are set so as to be pushed against the inner peripheral surfaces of the pair of feed pawls 52 respectively. Accordingly, the torsion spring 55 is set in a state of applying the urging force to mesh the pair of feed pawls 52 with the internal teeth 51 of the rotation transmission plate 36 with the output shaft 22 as a fulcrum.

Figure 37:
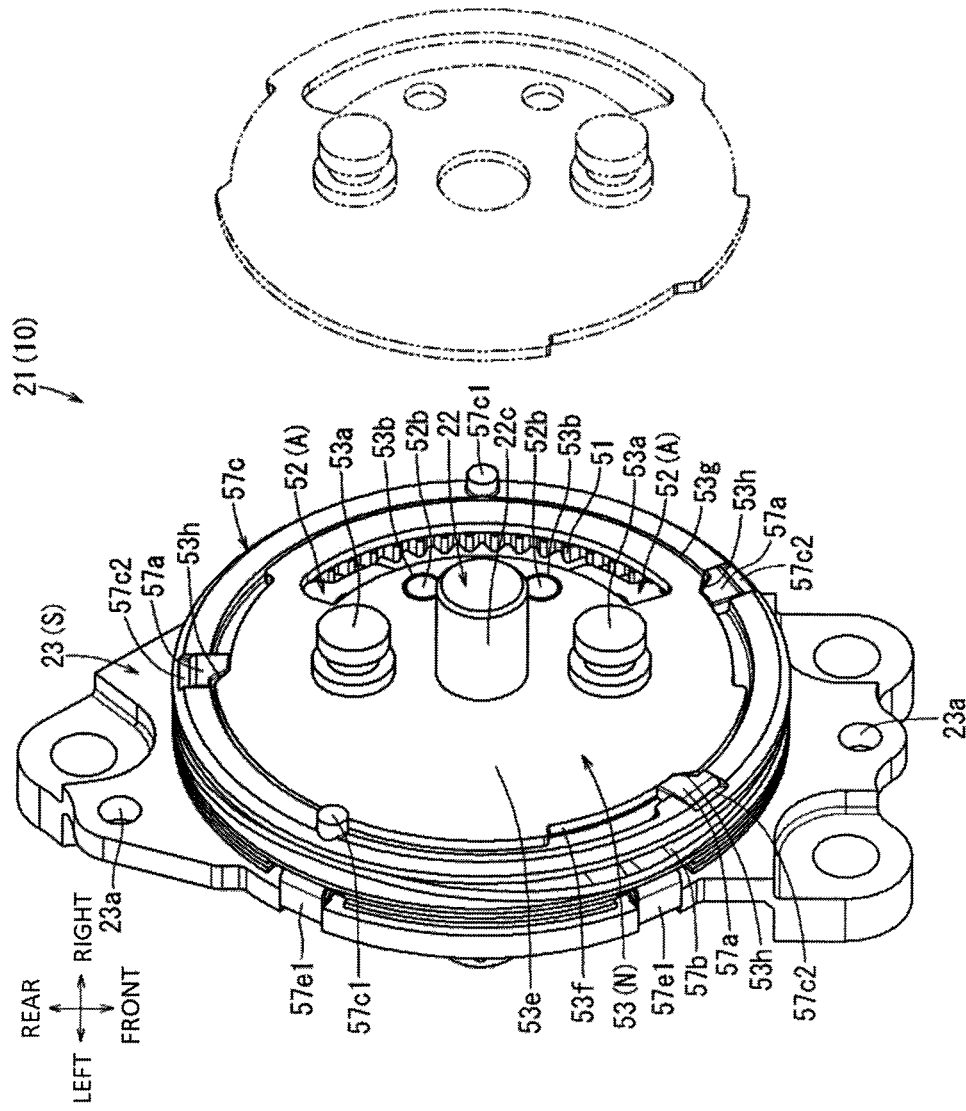
FIG. 37 is a diagram showing a state in which an inner lever is set on the feed pawl.

With the above set, as shown in FIG. 37, the pair of feed pawls 52 are brought into a state of being fitted to positions where the inner lever 53 can be inserted from the right side thereof. Specifically, the inner lever 53 is assembled to the pair of feed pawls 52 set as described above such that the end portion 22c of the output shaft 22 is passed into the center hole 53d from a right side of the rotation transmission plate 36. Accordingly, the hinge portions 52b protruding in a pin shape from the right side surface of the feed pawls 52 can be assembled by being inserted into two through holes 53b that penetrate the inner lever 53 and that are formed in a round hole shape respectively. The pair of feed pawls 52 are connected to the inner lever 53 in a state in which the pair of feed pawls 52 can rotate around the hinge portions 52b by inserting the corresponding through holes 53b of the inner lever 53 into the hinge portions 52b.

Therefore, since the temporary holding member 54 sets (temporarily holding) the pair of feed pawls 52 and the torsion spring 55 to the rotation transmission plate 36, it is possible to simply connect the inner lever 53 to the pair of feed pawls 52 placed on the rotation transmission plate 36 without requiring a holding operation such as pressing the feed pawls 52 urged by the torsion spring 55 by hands. The temporary holding member 54 is made of resin, and the inner lever 53 is connected to the pair of feed pawls 52, so that the temporary holding member 54 is connected to the inner lever 53 via the pair of feed pawls 52 so as to be integrally rotatable with the inner lever 53. Incidentally, all of the components of the rotation control device 21 other than the temporary holding member 54 are made of a metal member.

Figure 9:
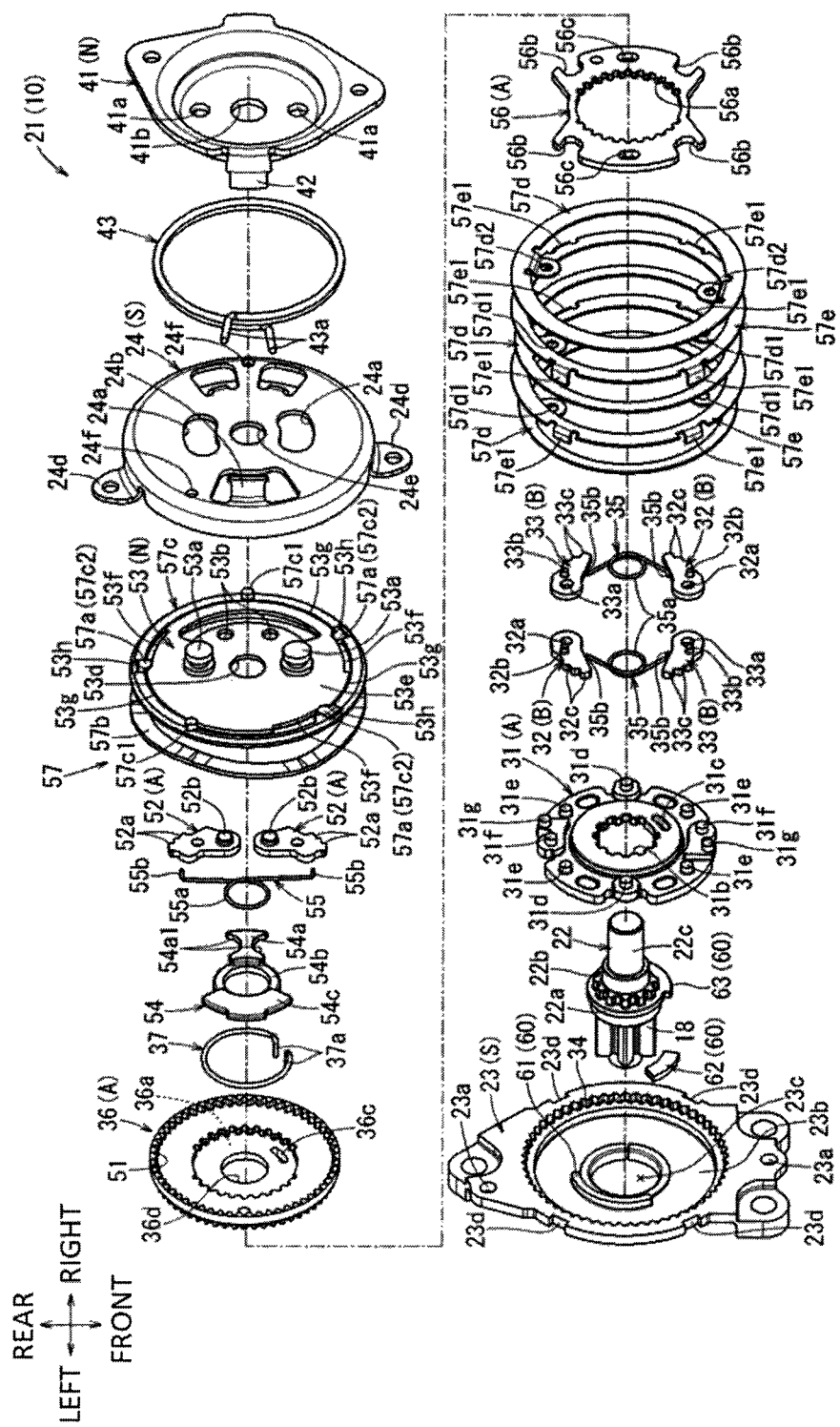
FIG. 9 is an exploded perspective view of the rotation control device as viewed from the outer side of the seat.

As shown in FIG. 9, the temporary holding member 54 further includes a spacer portion 54c that protrudes in a fan shape outward in the radial direction from a partial region. The partial region faces, in the rotational direction, a region at which the feed pawl holding portion 54a of the shaft support portion 54b is formed. The spacer portion 54c is interposed in the thrust direction between the set rotation transmission plate 36 and a facing portion 53e of the inner lever 53, and ensures a space in the thrust direction therebetween. By interposing the spacer portion 54c, the inner lever 53 can be smoothly rotated with respect to the rotation transmission plate 36.

As shown in FIG. 9, the inner lever 53 has a configuration in which round-pin-shaped stopper pins 53a are respectively coupled to two front-rear places on the facing portion 53e having a substantially disc shape that faces the thrust direction. Each stopper pin 53a protrudes rightward from the facing portion 53e of the inner lever 53 and is inserted into corresponding through hole 41a of the outer lever 41 by passing through the corresponding through hole 24a of the cover 24, so as to be integrally coupled to the outer lever 41.

Figure 29:
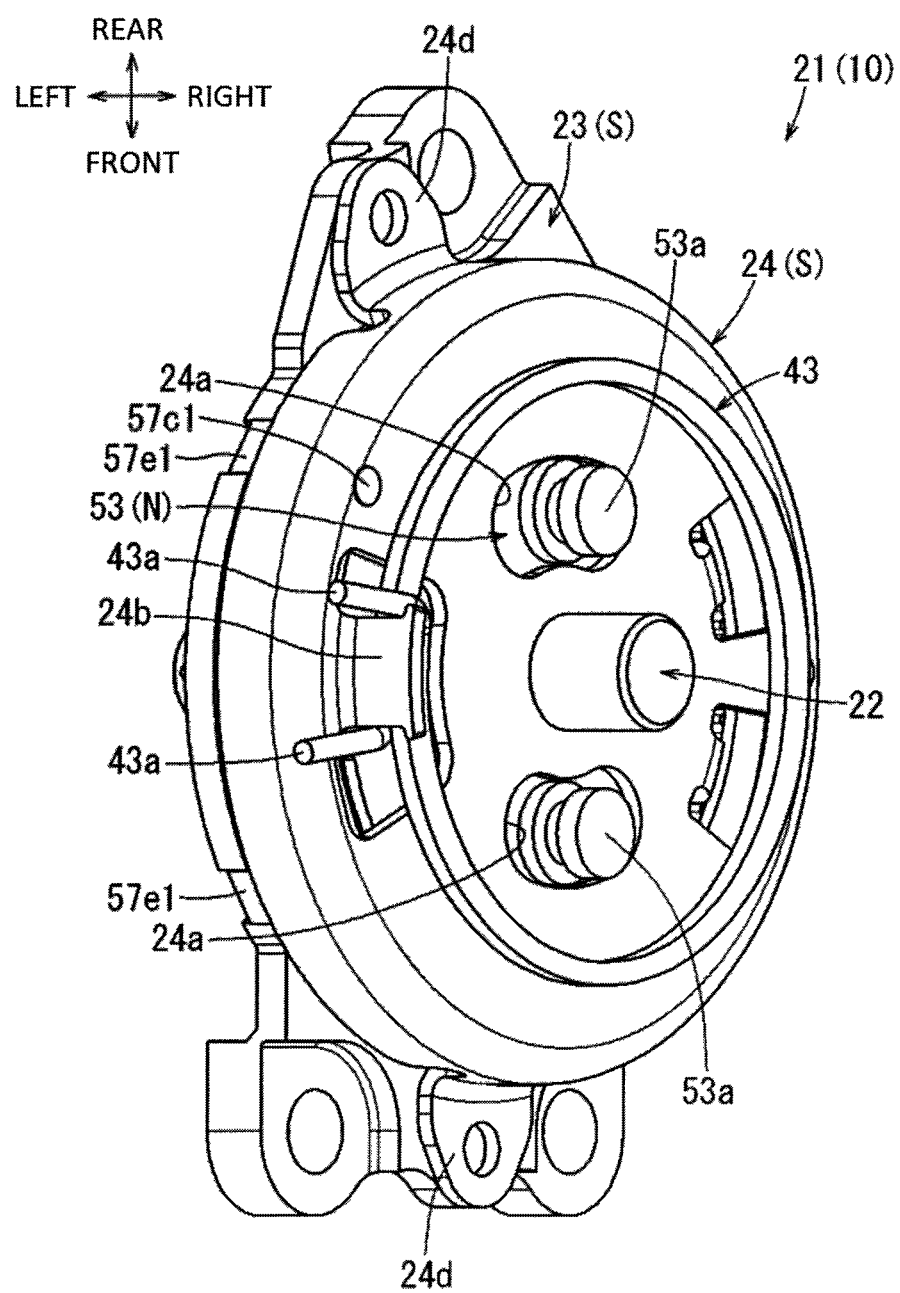
FIG. 29 is a perspective view showing a state of an input member at a time when the operation handle is in the neutral position.
Figure 30:
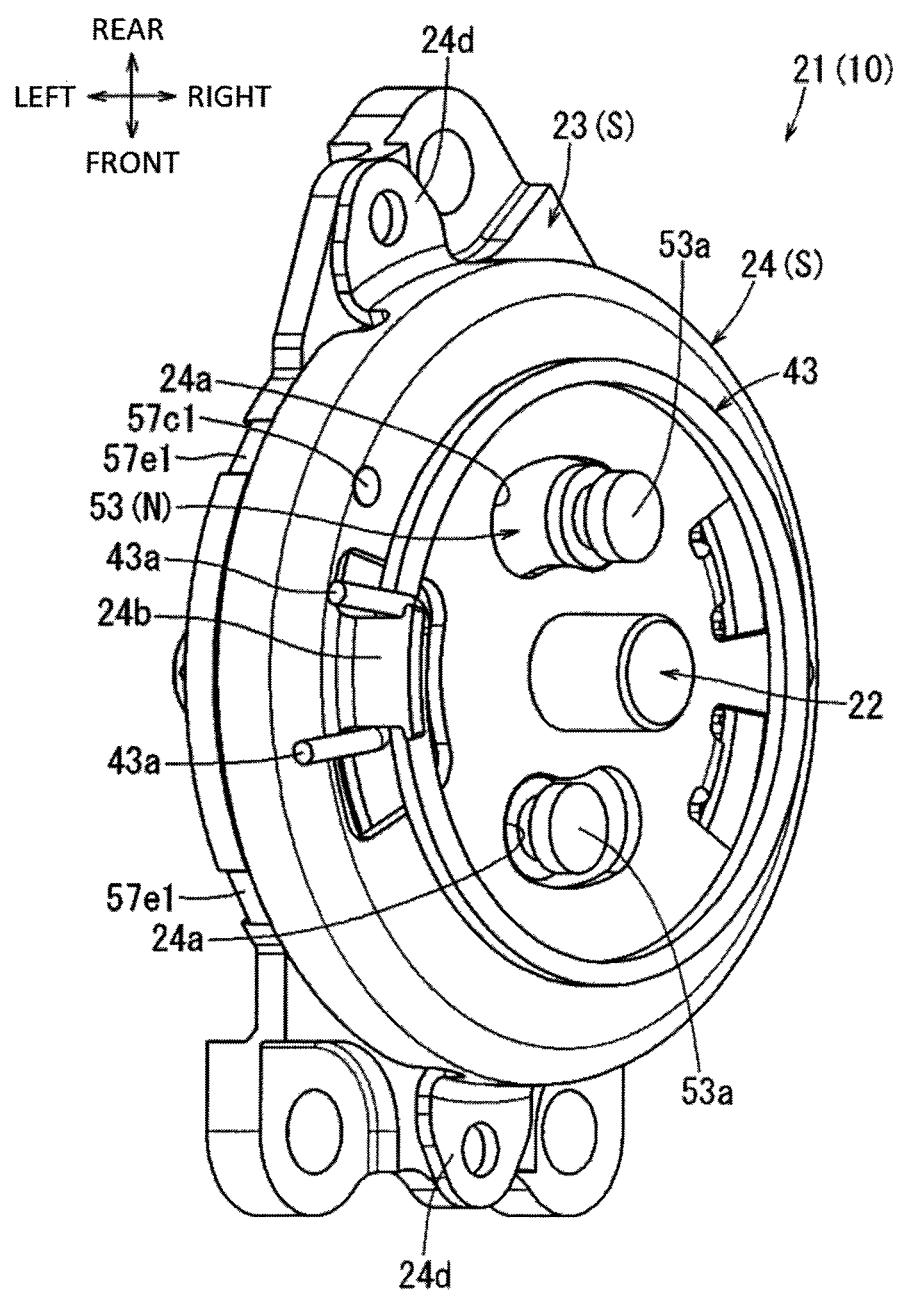
FIG. 30 is a perspective view showing a state of the input member at a time when the operation handle is pushed down to a maximum position.
Figure 31:
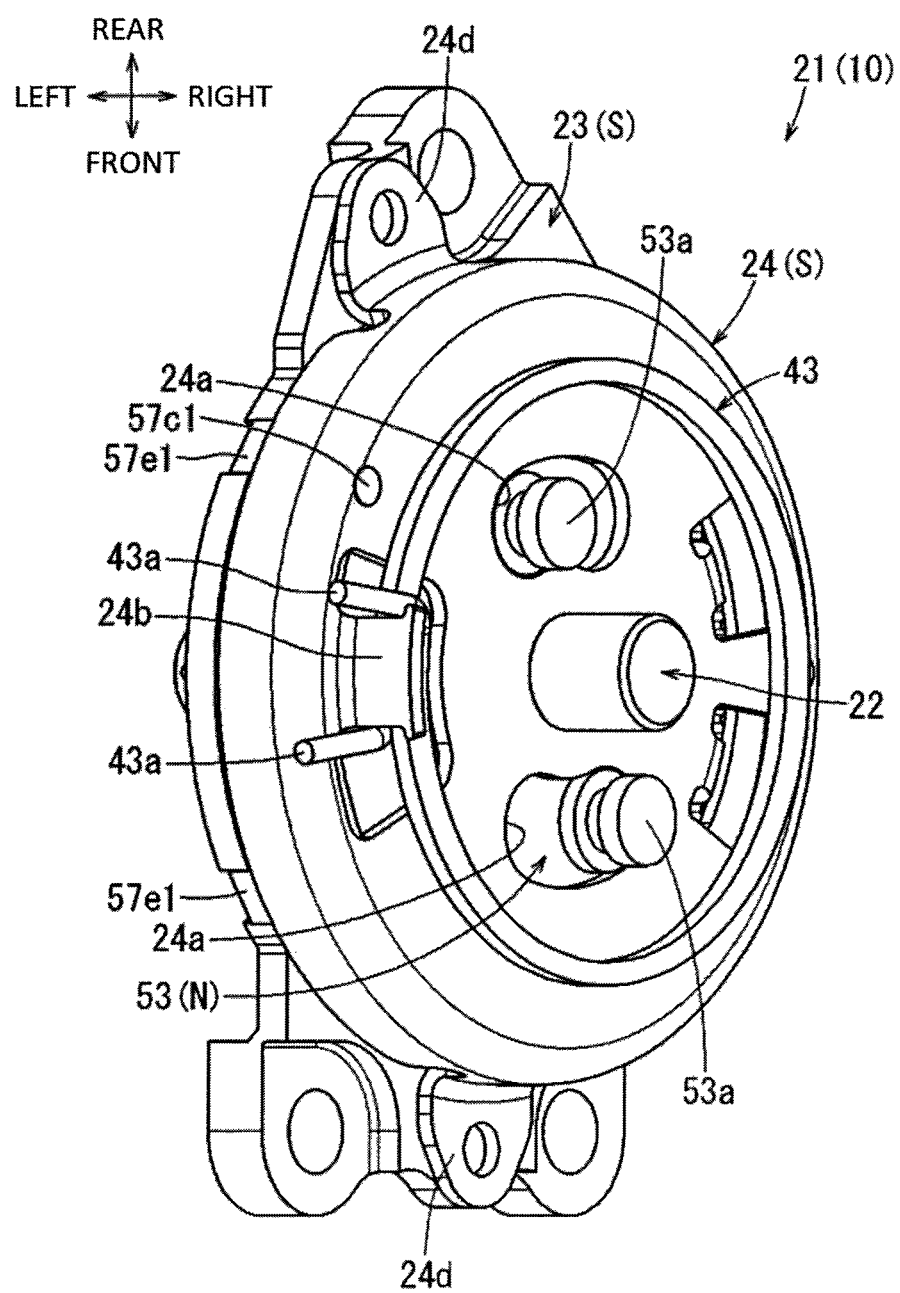
FIG. 31 is a perspective view showing a state of the input member at a time when the operation handle is pulled up to a maximum position.

Each of the through holes 24a of the cover 24 is formed into a hole shape extending in a long shape in the rotational direction. As shown in FIG. 29, when the inner lever 53, which is the input member N, is in the neutral position at which the inner lever 53 is positioned before the operation, the respective through holes 24a position the respective stopper pins 53a at central positions in the rotational direction of the through holes 24a. When the inner lever 53 is pushed down from the neutral position as shown in FIG. 30, each stopper pin 53a abuts on an end surface of each through hole 24a corresponding to the rotational direction, and a rotational movement of the inner lever 53 (input member N) in a pushed-down direction is locked. Further, when the inner lever 53 is pulled up from the neutral position as shown in FIG. 31, each stopper pin 53a abuts on the end surface of each through hole 24a corresponding to the rotational direction, and the rotational movement of the inner lever 53 (the input member N) in a pulling direction is locked.

The pair of feed pawls 52 are rotatably assembled to a left side surface of the inner lever 53. The substantially disc-shaped rotation transmission plate 36 is provided on a left side of the inner lever 53. The rotation transmission plate 36 is disposed between the inner lever 53 and the rotating plate 31. A substantially disc-shaped control plate 56 is assembled to a left side surface portion of the rotation transmission plate 36 in a shape of being integrated with the rotation transmission plate 36 in the rotational direction.

The control plate 56 is assembled to the left side surface portion of the rotation transmission plate 36 in the shape of being integrated with the rotation transmission plate 36 in the rotational direction. Specifically, a spline fitting portion 36a which is half-cut to protrude in a substantially cylindrical shape to the left side from the central part of the rotation transmission plate 36 is fitted into a spline hole 56a formed to penetrate through the central part of the control plate 56, so that the control plate 56 is assembled to the rotation transmission plate 36 in an integrated state in the rotational direction.

On an outer peripheral part of the control plate 56, each of the pins 32b, 33b protruding rightward from each of the pawls 32, 33 is received from the left side, and control holes 56b for controlling the operation of locking and releasing the pawls 32, 33 are formed at four places in the rotational direction. Further, engagement long holes 56c are formed on a disc surface portion of the control plate 56 at two places facing each other in the rotational direction so as to receive the respective protrusions 31d protruding in a pin shape from two corresponding places of the rotating plate 31 to the right side.

Figure 17:
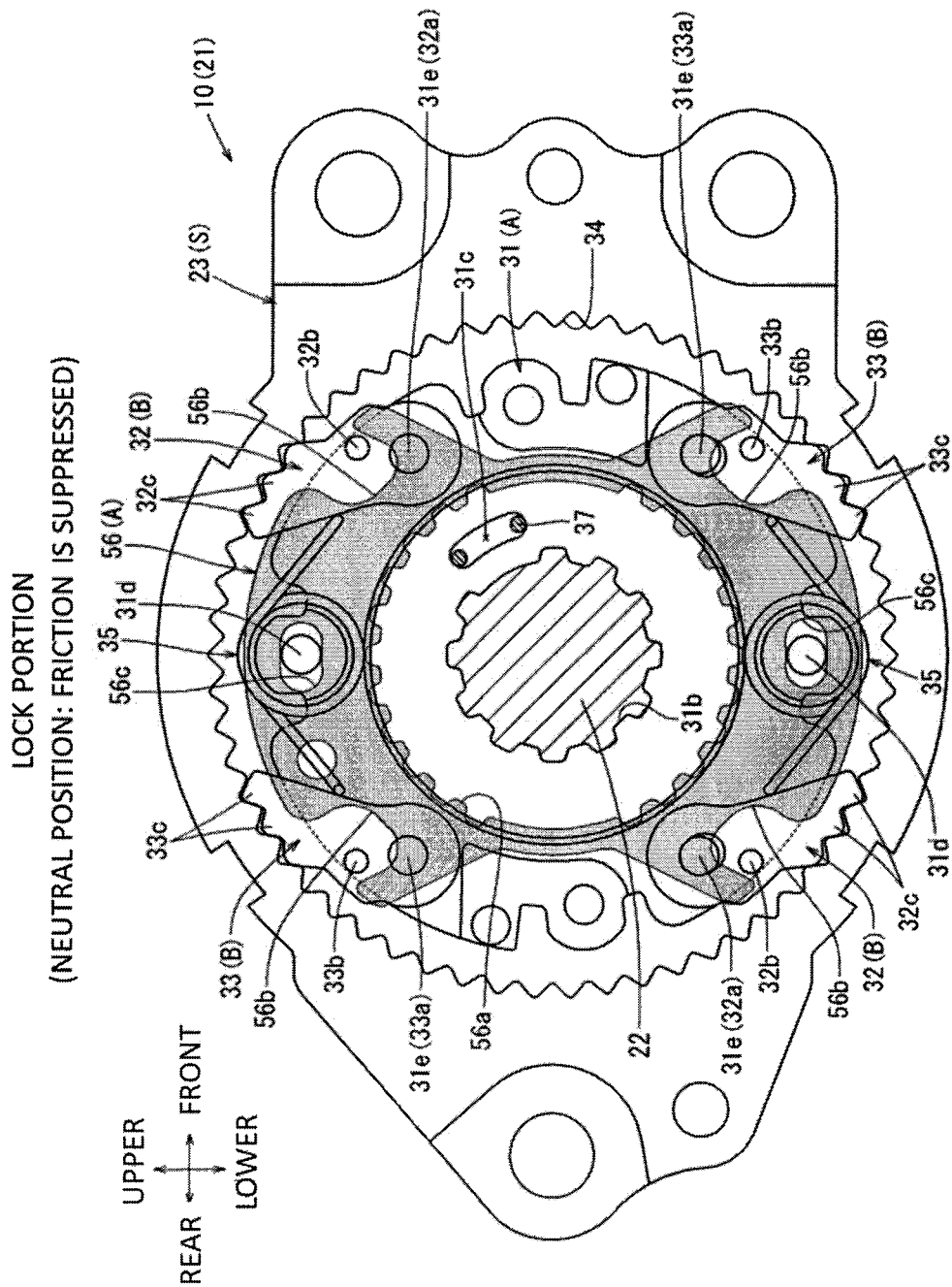
FIG. 17 is a state diagram of a lock portion at the time when the operation handle is in the neutral position.

The engagement long hole 56c is formed into a long hole shape extending in the rotational direction. As shown in FIG. 17, when a rotation position of the control plate 56 (rotation transmission plate 36) with respect to the rotating plate 31 is held at the neutral position by the urging of a torsion spring 37 hooked between the rotation transmission plate 36 and the rotating plate 31, the protrusions 31d of the rotating plate 31 are positioned at substantially central positions of the engagement long holes 56c in the long hole shape, respectively. Accordingly, the engagement long holes 56c allow the control plate 56 (rotation transmission plate 36) to rotate in the forward and reverse directions with respect to the rotating plate 31 from the above state.

Figure 21:
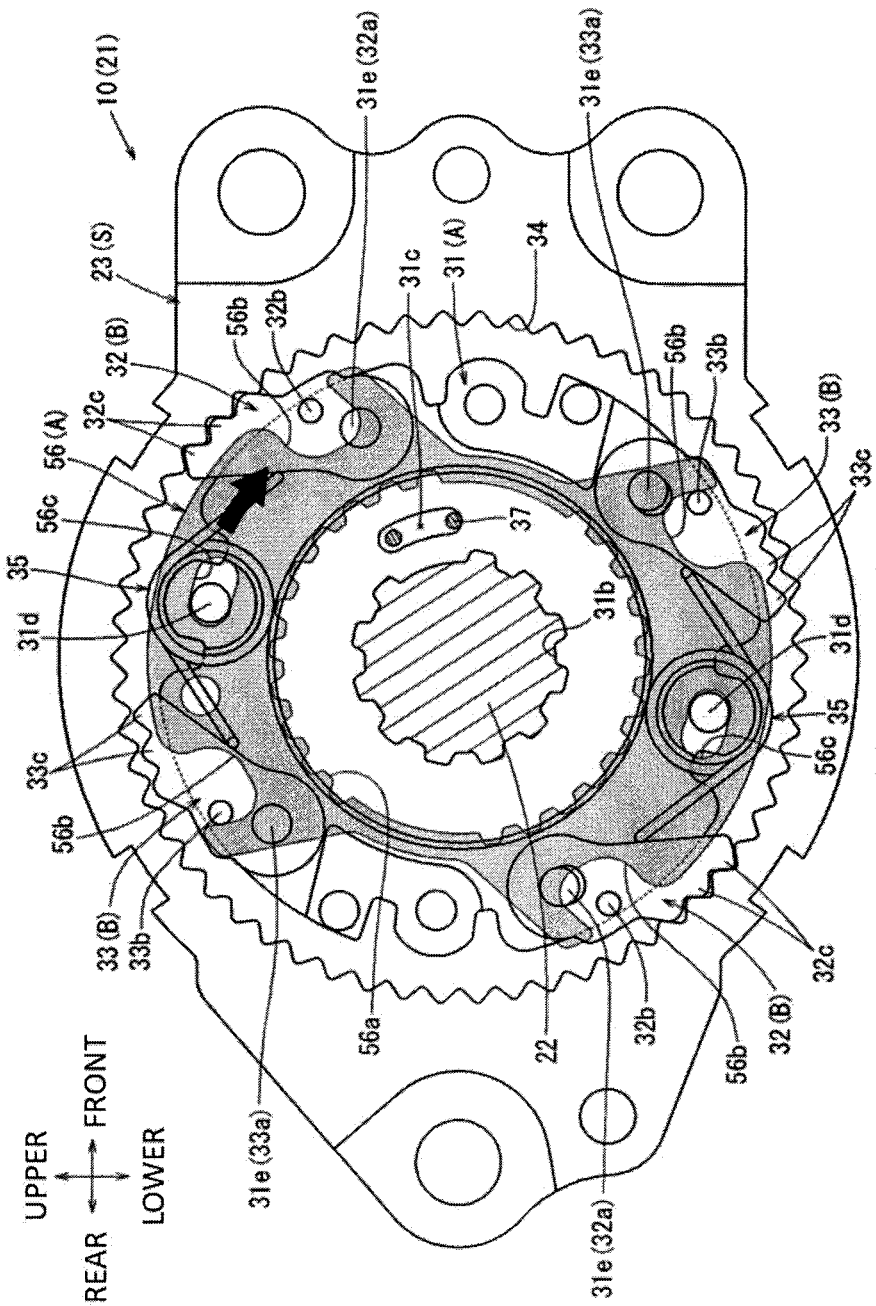
FIG. 21 is a state diagram of the lock portion at a time when the lock portion is feeding-rotated by the progress of pushing down the operation handle from the neutral position.
Figure 26:
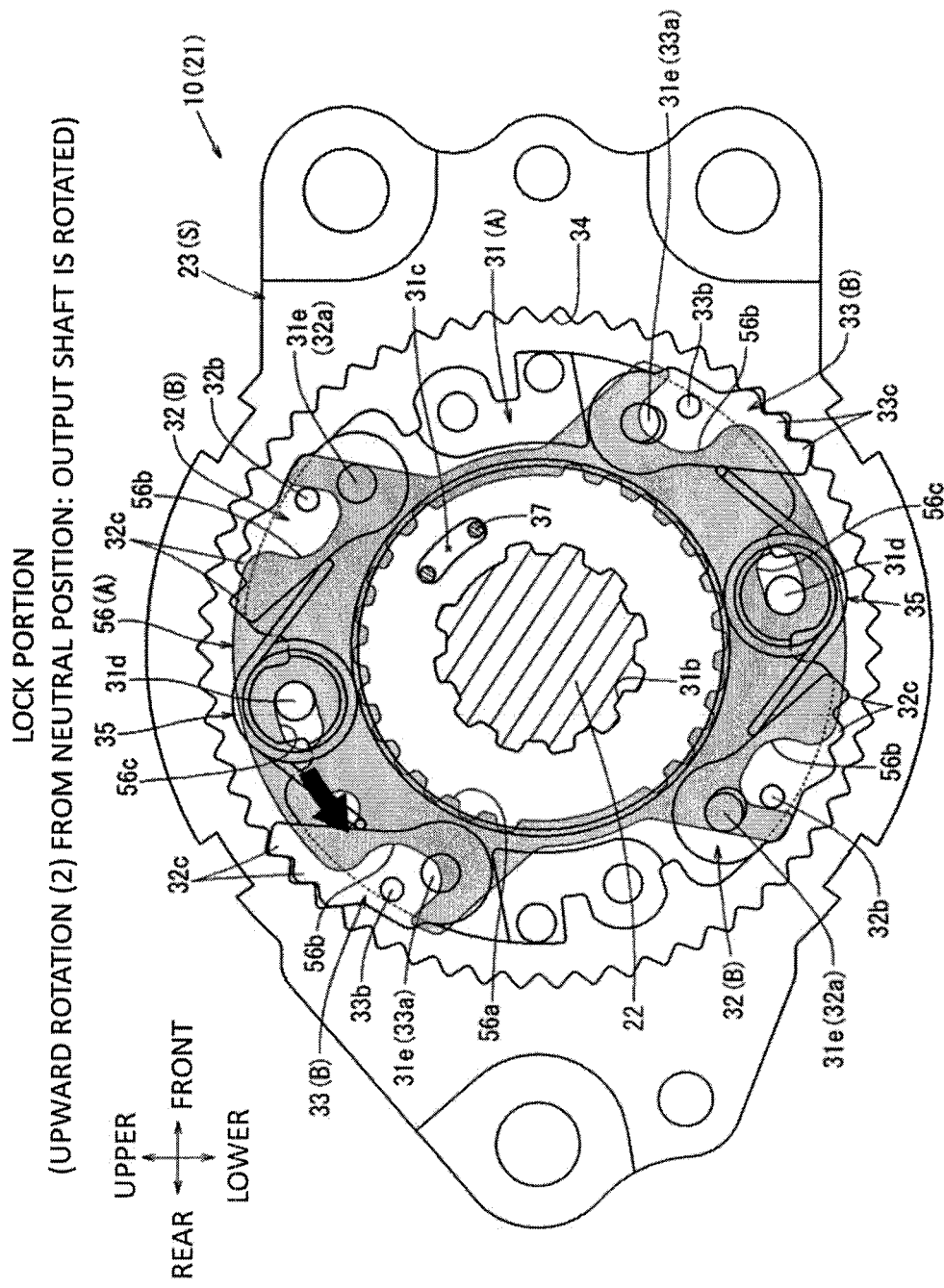
FIG. 26 is a state diagram of the lock portion at a time when the lock portion is feeding-rotated by the progress of pulling up the operation handle from the neutral position.

However, as shown in FIGS. 21 and 26, the control plate 56 (rotation transmission plate 36) is rotated clockwise (see FIG. 21) or counterclockwise (see FIG. 26) with respect to the rotating plate 31 by the operation of the operation handle 20, so that each engagement long hole 56c makes each protrusion 31d abut on an end surface corresponding to a rotational direction thereof. Accordingly, the rotating plate 31 is turned integrally with the control plate 56 (rotation transmission plate 36) in the rotational direction.

The ring-shaped torsion spring 37 hooked between the rotation transmission plate 36 and the rotating plate 31 is inserted across a long hole 36c of the rotation transmission plate 36 and a long hole 31c of the rotating plate 31 by bending the end portions 37a on both sides of the torsion spring 37 to the left side. Accordingly, the torsion spring 37 is in a state of exerting an urging force in both rotational directions across the long holes 36c and 31c. The torsion spring 37 maintains a rotation angle of the rotation transmission plate 36 at the neutral position with respect to the rotating plate 31 by the urging force of the torsion spring 37.

Figure 10:
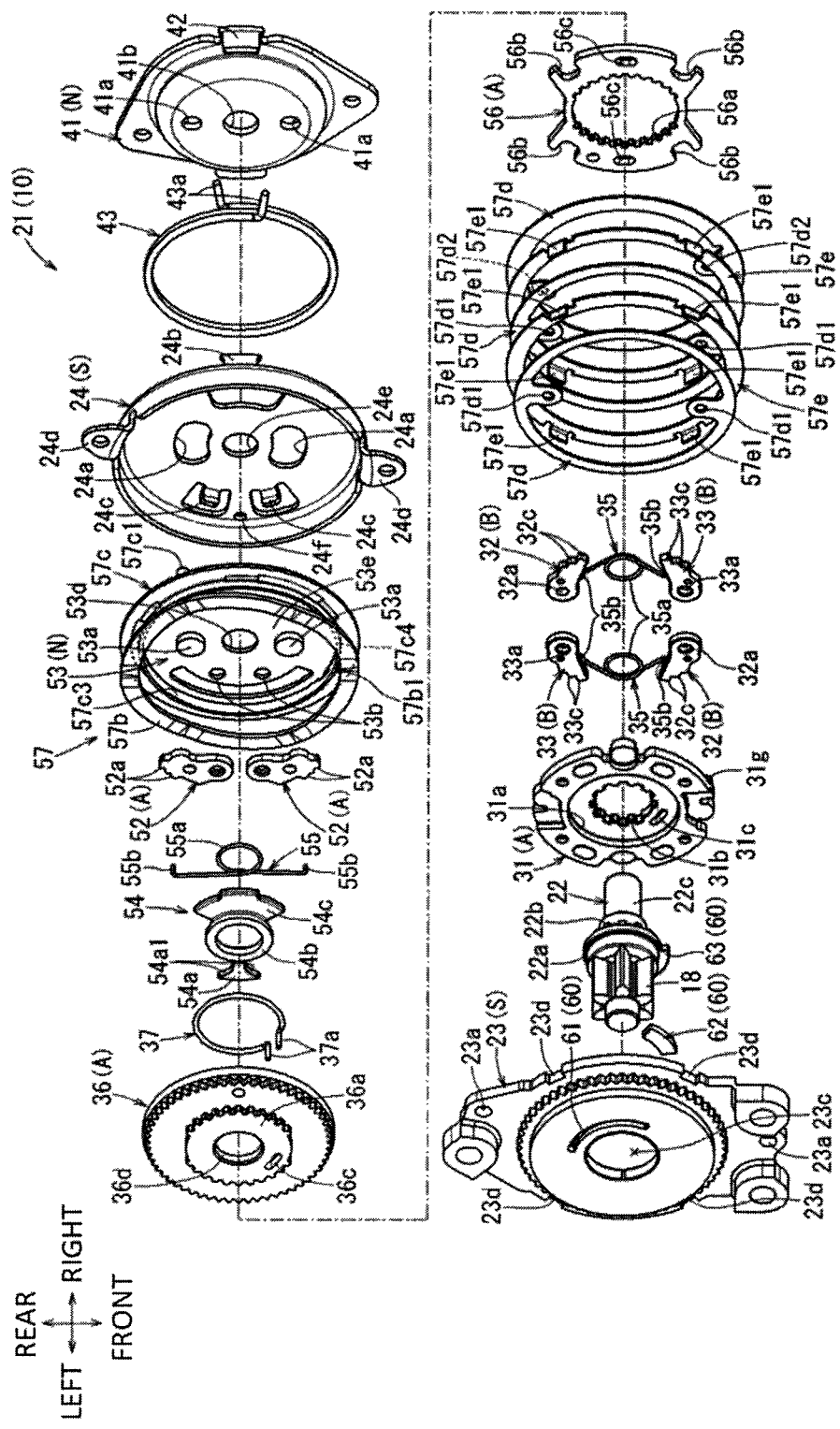
FIG. 10 is an exploded perspective view of the rotation control device as viewed from the outer side of the seat.
Figure 11:
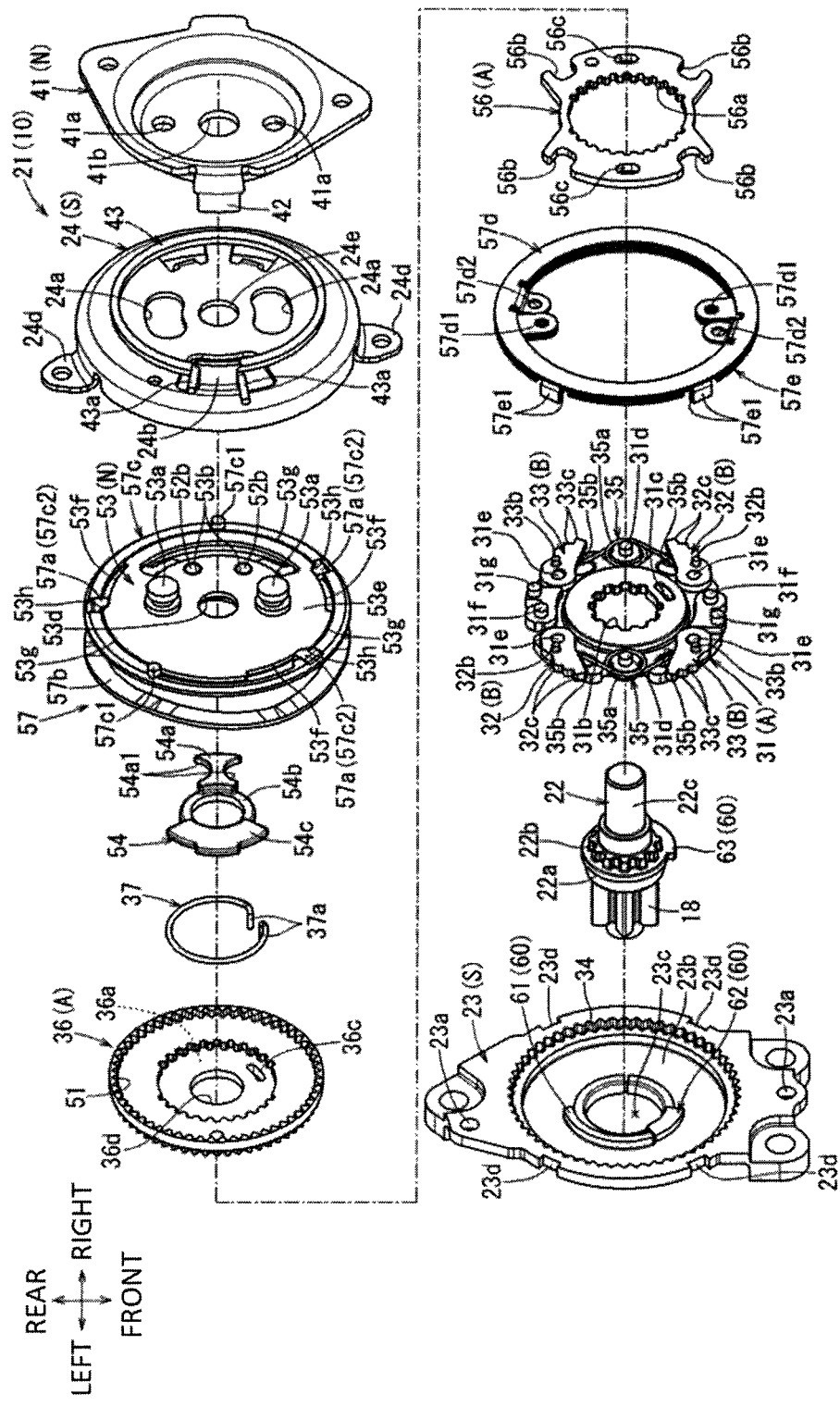
FIG. 11 is an exploded perspective view showing a state in which some components of the rotation control device shown in FIG. 9 are assembled.
Figure 12:
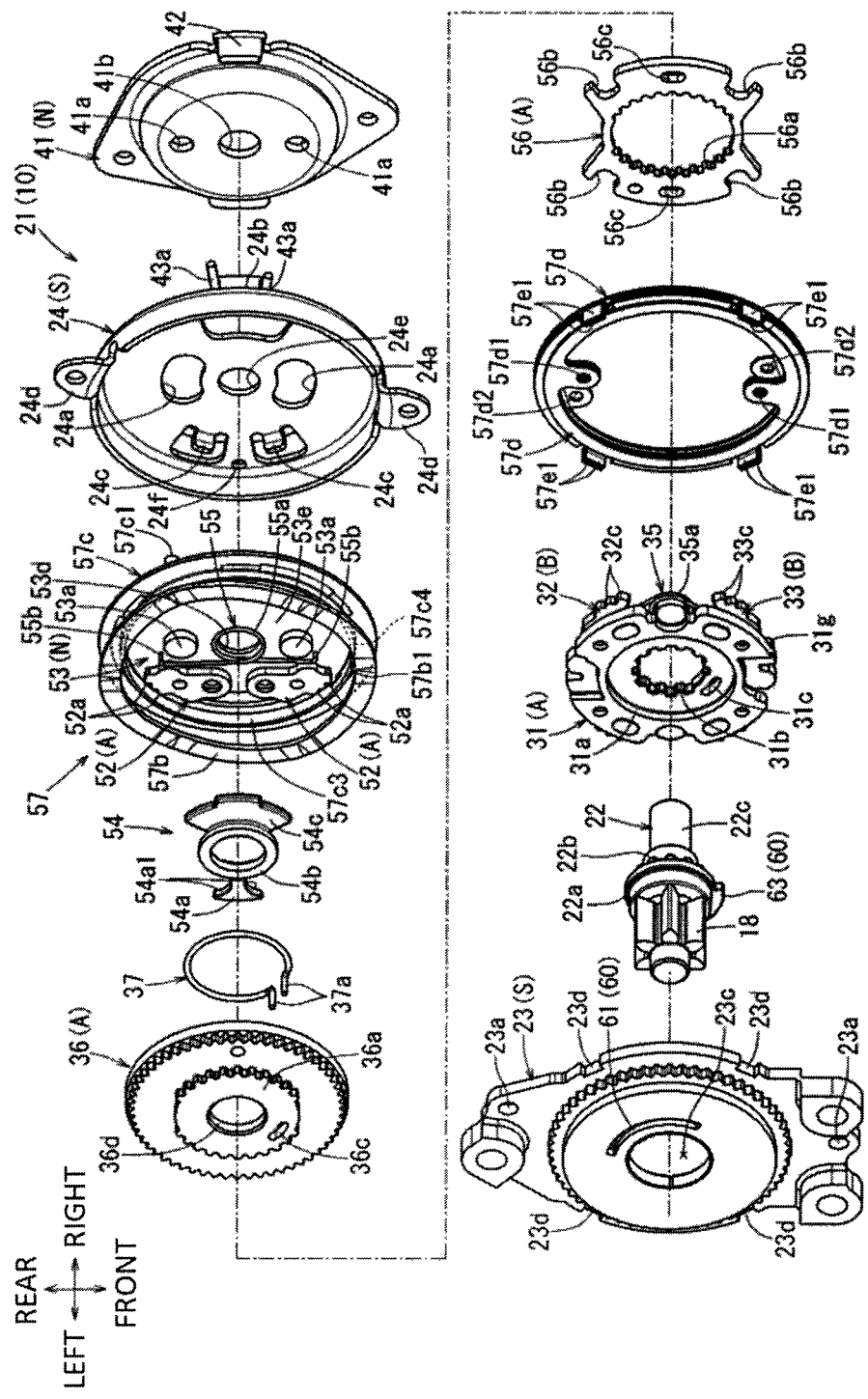
FIG. 12 is an exploded perspective view showing the state in which some components of the rotation control device shown in FIG. 9 are assembled, as viewed from the inner side of the seat.
Figure 13:
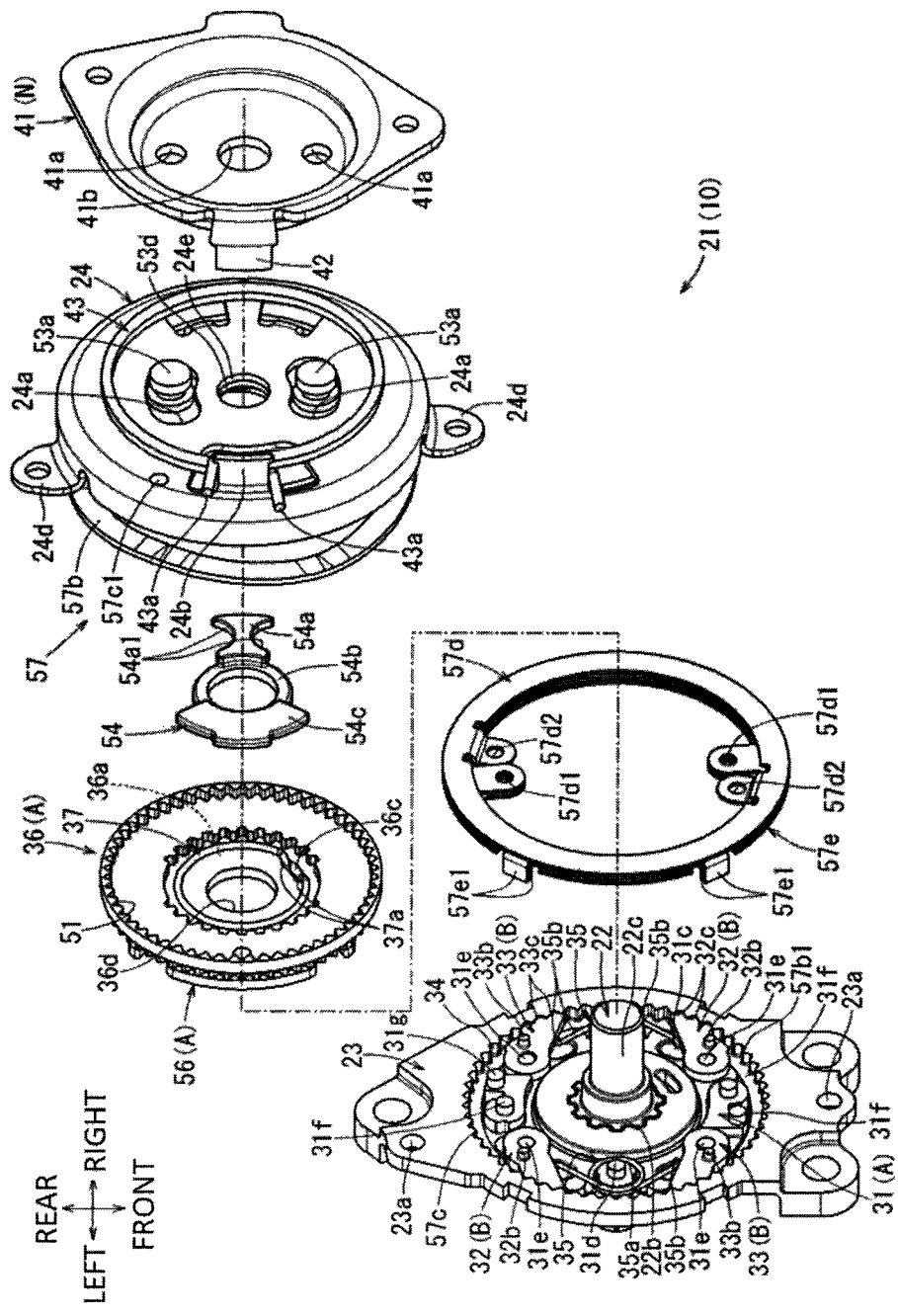
FIG. 13 is an exploded perspective view showing a state in which some components of the rotation control device shown in FIG. 11 are assembled.
Figure 14:
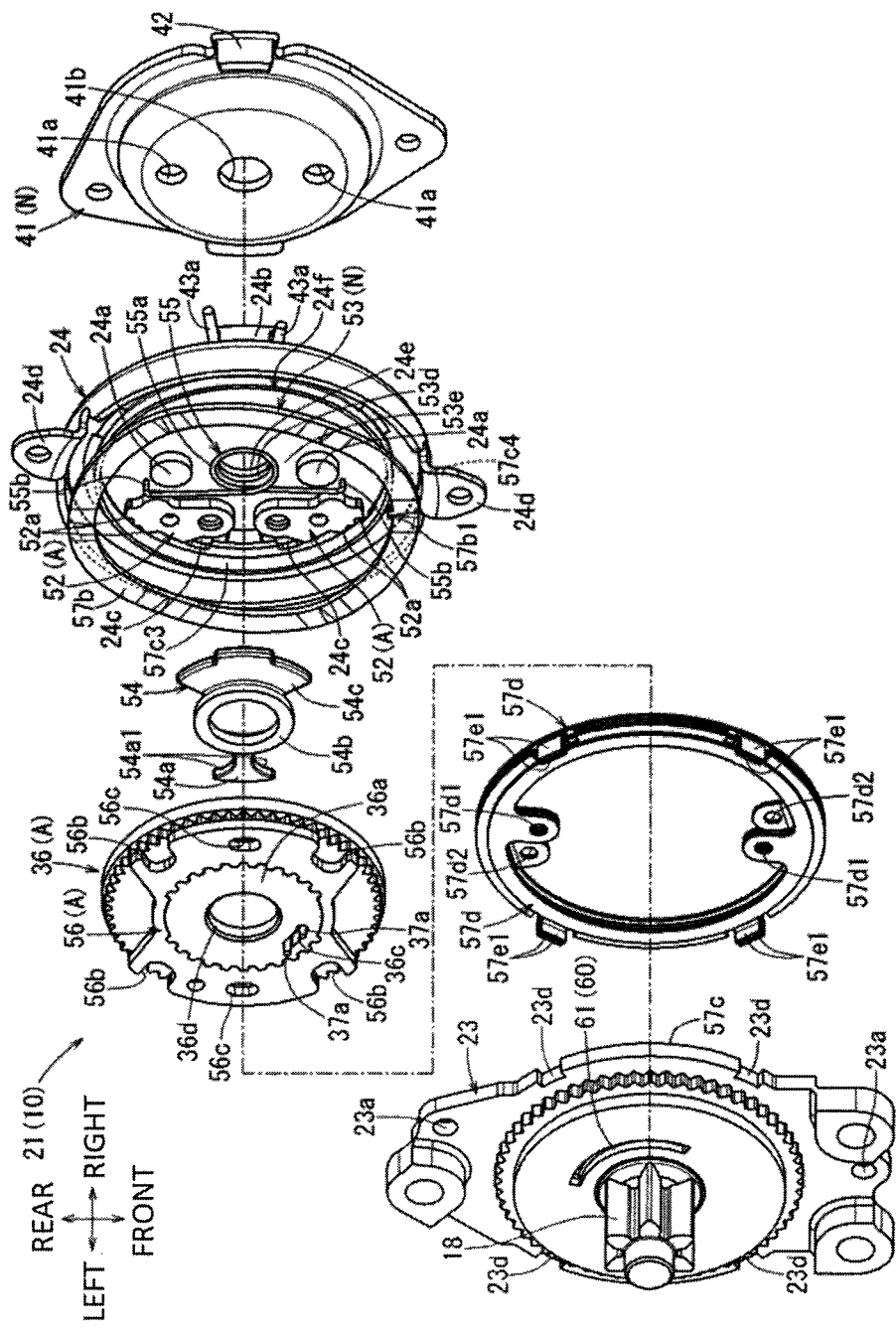
FIG. 14 is an exploded perspective view showing a state in which some components of the rotation control device shown in FIG. 11 are assembled, as viewed from the inner side of the seat.

Here, FIGS. 9 and 10 show a state in which the components of the rotation control device 21 are disassembled apart. Further, FIGS. 11 and 12 show a state in which the pawls 32, 33 and the torsion springs 35 are assembled to the rotating plate 31, the feed pawls 52 and the torsion springs 55 are assembled to the inner lever 53, and the torsion spring 43 is assembled to the cover 24. Further, FIGS. 13 and 14 show a state in which the rotating plate 31 is assembled to the base 23 and the control plate 56 is assembled to the rotation transmission plate 36.

Figure 15:
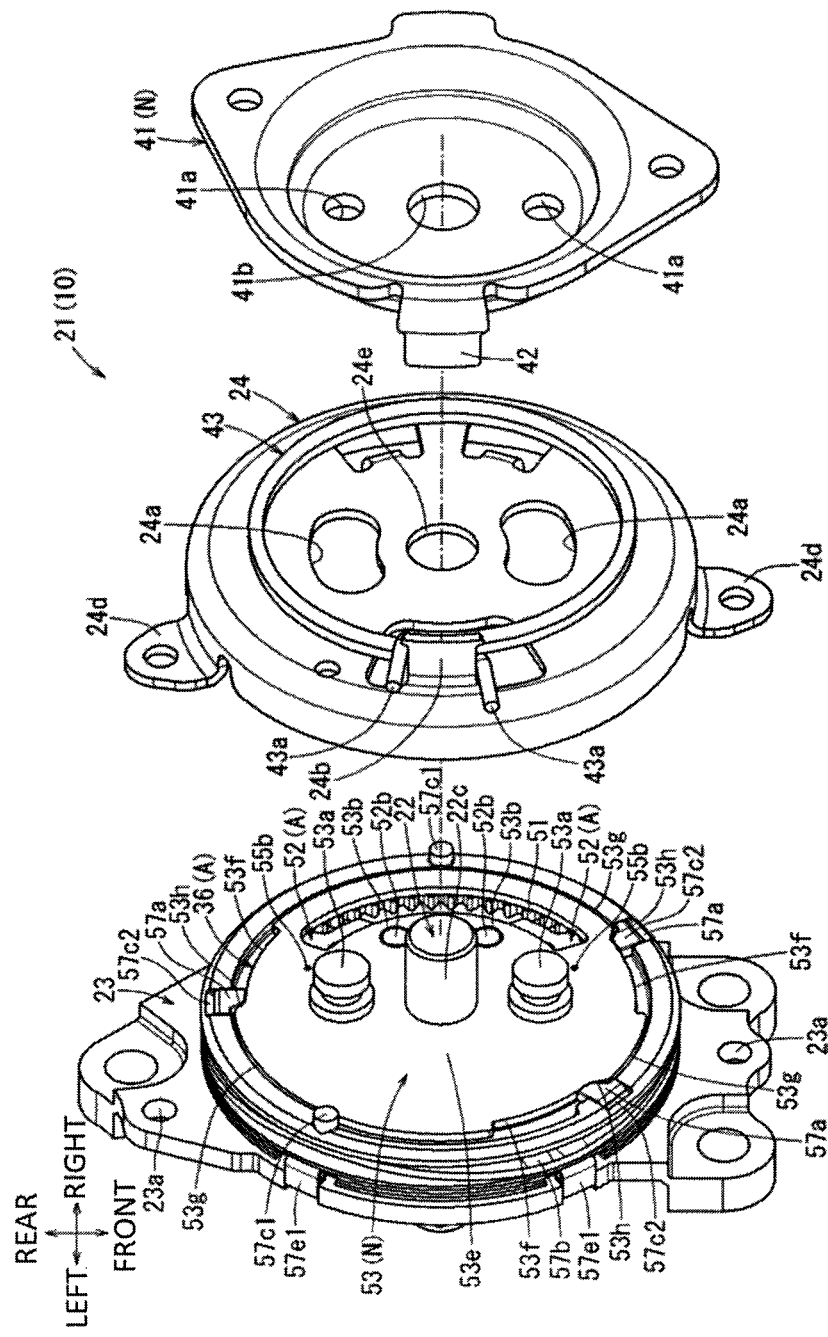
FIG. 15 is an exploded perspective view showing a state in which some components of the rotation control device shown in FIG. 13 are assembled.

Further, FIG. 15 shows a state in which the rotation transmission plate 36 is assembled to the rotating plate 31 (see FIG. 13) assembled to the base 23, and the feed pawls 52 and the inner lever 53 are assembled to the rotation transmission plate 36. Each of the above drawings does not show an assembling procedure of the rotation control device 21, but shows an assembled state of the respective components. In practice, the rotation control device 21 is configured such that the components shown in FIG. 9 are set and assembled in the direction of gravity from the left side shown in FIG. 9.

Here, as shown in FIG. 9, a feed portion A, which transmits the rotation of the inner lever 53 (input member N) to the output shaft 22 as feeding rotation, is configured by the pair of feed pawls 52 that are connected to the inner lever 53 (input member N) and transmit the rotationally operated movement to the rotation transmission plate 36 as feeding rotation, the rotation transmission plate 36 that rotates in response to transmission of rotational power from the feed pawls 52, the control plate 56 that is integrally connected to the rotation transmission plate 36, and the rotating plate 31 that rotates integrally with the control plate 56 from a half way by engagement with the control plate 56 (rotation transmission plate 36). Further, a lock portion B is a lock structure which locks the rotation of the pinion gear 18 feeding-rotated by the feed portion A with respect to the base 23 by the urging of the pawls 32, 33. Further, a support member S is configured by the base 23 and the cover 24 that is integrally assembled to the base 23.

An outer peripheral surface 22a that is curved concentrically without a gear shape is formed between the pinion gear 18 and the spline 22b of the output shaft 22. A rotation shaft side protrusion 63 partially protruding outward in the radial direction is formed in a partial region of the outer peripheral surface 22a in the rotational direction. The rotation shaft side protrusion 63 is set on a right side surface of the guide recessed portion 23b of the base 23 by inserting the pinion gear 18 into the center hole 23c of the base 23 from the right side.

An arc-shaped support member side protrusion 61 is formed on the right side surface of the guide recessed portion 23b of the base 23 by punching. On the other hand, as shown in FIG. 10, a sliding surface portion 31a that forms a cylindrical inner peripheral surface is formed around the spline hole 31b of the rotating plate 31. The sliding surface portion 31a is formed when the central portion of the rotating plate 31 is half-cut into a cylindrical shape to the right side. The sliding surface portion 31a is set to be concentric with the spline hole 31b. When the rotating plate 31 rotates with respect to the base 23, an outer periphery of the support member side protrusion 61 slides on an inner periphery of the sliding surface portion 31a. An engaging piece 62 is disposed so as to slide in a gap between the inner periphery of the sliding surface portion 31a and the outer peripheral surface 22a of the output shaft 22.

Figure 32:
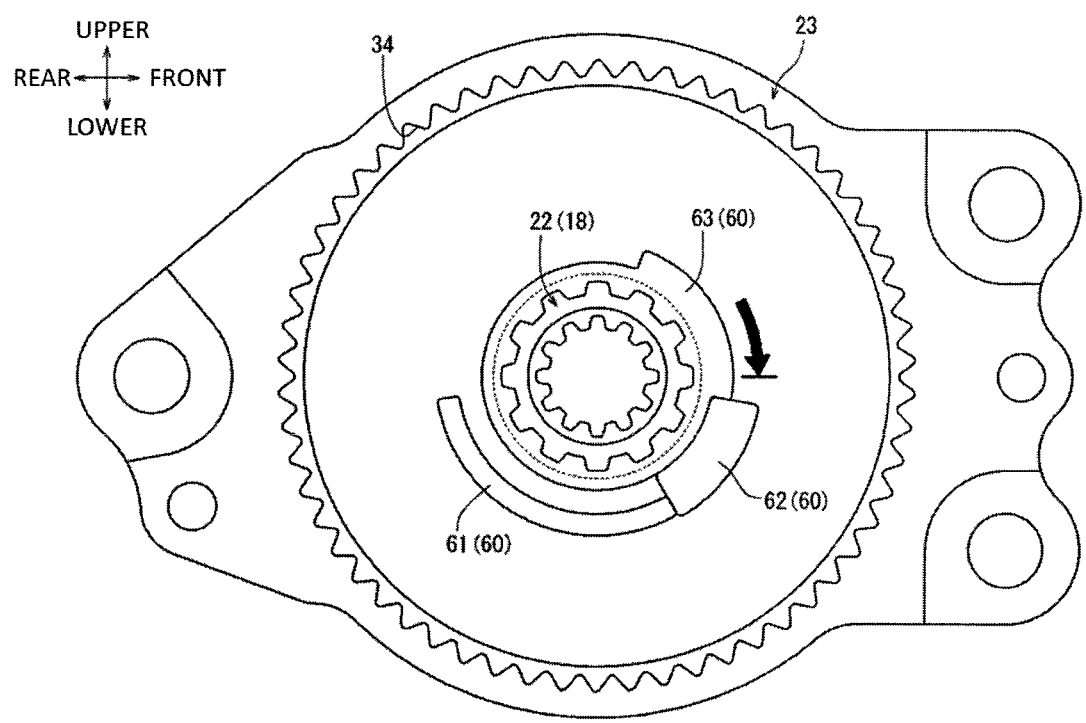
FIG. 32 is a diagram showing a state in which rotation of a pinion gear in a downward direction is locked by a stopper.
Figure 33:
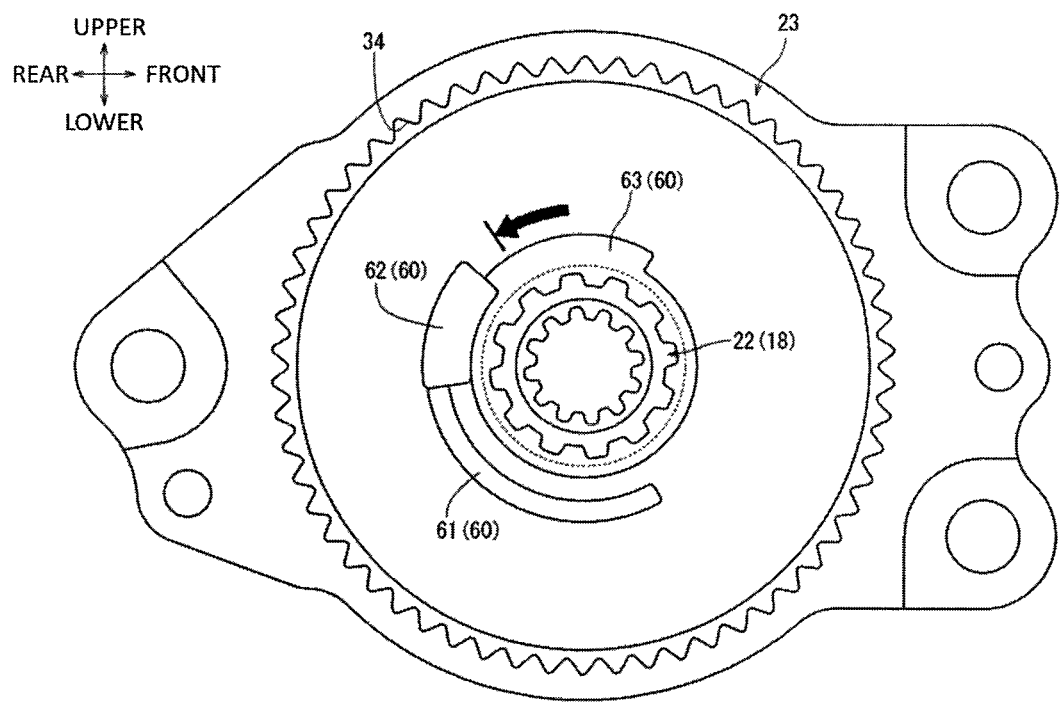
FIG. 33 is a diagram showing a state in which rotation of the pinion gear in an upward direction is locked by the stopper.

Therefore, when the output shaft 22 is rotated in a downward direction by the operation of the rotation control device 21 and reaches a lower limit position as shown in FIG. 32, the rotation shaft side protrusion 63 abuts on an end surface of the support member side protrusion 61 with the engaging piece 62 sandwiched therebetween, and further rotation of the output shaft 22 is stopped. Further, when the output shaft 22 is rotated in an upward direction by the operation of the rotation control device 21 and reaches an upper limit position as shown in FIG. 33, the rotation shaft side protrusion 63 abuts on an end surface on the opposite side of the support member side protrusion 61 with the engaging piece 62 sandwiched therebetween, and further rotation of the output shaft 22 is stopped. A mechanism for stopping the rotation of the output shaft 22 by making the rotation shaft side protrusion 63 abut on the support member side protrusion 61 in the rotational direction with the engaging piece 62 sandwiched therebetween is configured as a stopper 60.

As shown in FIG. 9, a friction generating portion 57 is provided between the base 23 and the cover 24 which form the support member S and the rotating plate 31 to apply a sliding frictional resistance force to the rotational movement of the rotating plate 31 with respect to the support member S. The friction generating portion 57 includes: a ring-shaped guide member 57c provided on a left side surface portion of the cover 24; three clutch portions 57a provided, in a state of being guided, at three places of the guide member 57c in the rotational direction; a ring shaped leaf spring 57b provided on a left side of the guide member 57c and having a ring shape bent into a waveform having substantially the same diameter; and rotating rings 57d and fixed rings 57e which have substantially the same diameter and which are provided on a left side of the leaf spring 57b. The leaf spring 57b corresponds to an "elastic body" of the present disclosure.

The guide member 57c is slidably assembled to the left side surface portion of the cover 24 only in the thrust direction. Specifically, round-pin-shaped engaging protrusions 57c1 protruding from two left-right places on a right side surface of the guide member 57c are inserted into round-hole-shaped engaging holes 24f formed at two corresponding places of the cover 24 from the left side. Accordingly, the guide member 57c is assembled in a state in which the guide member 57c is movable integrally with the cover 24 in the rotational direction and the radial direction, but the guide member 57c is assembled in a state in which the guide member 57c is slidable in the thrust direction with respect to the cover 24.

Figure 38:
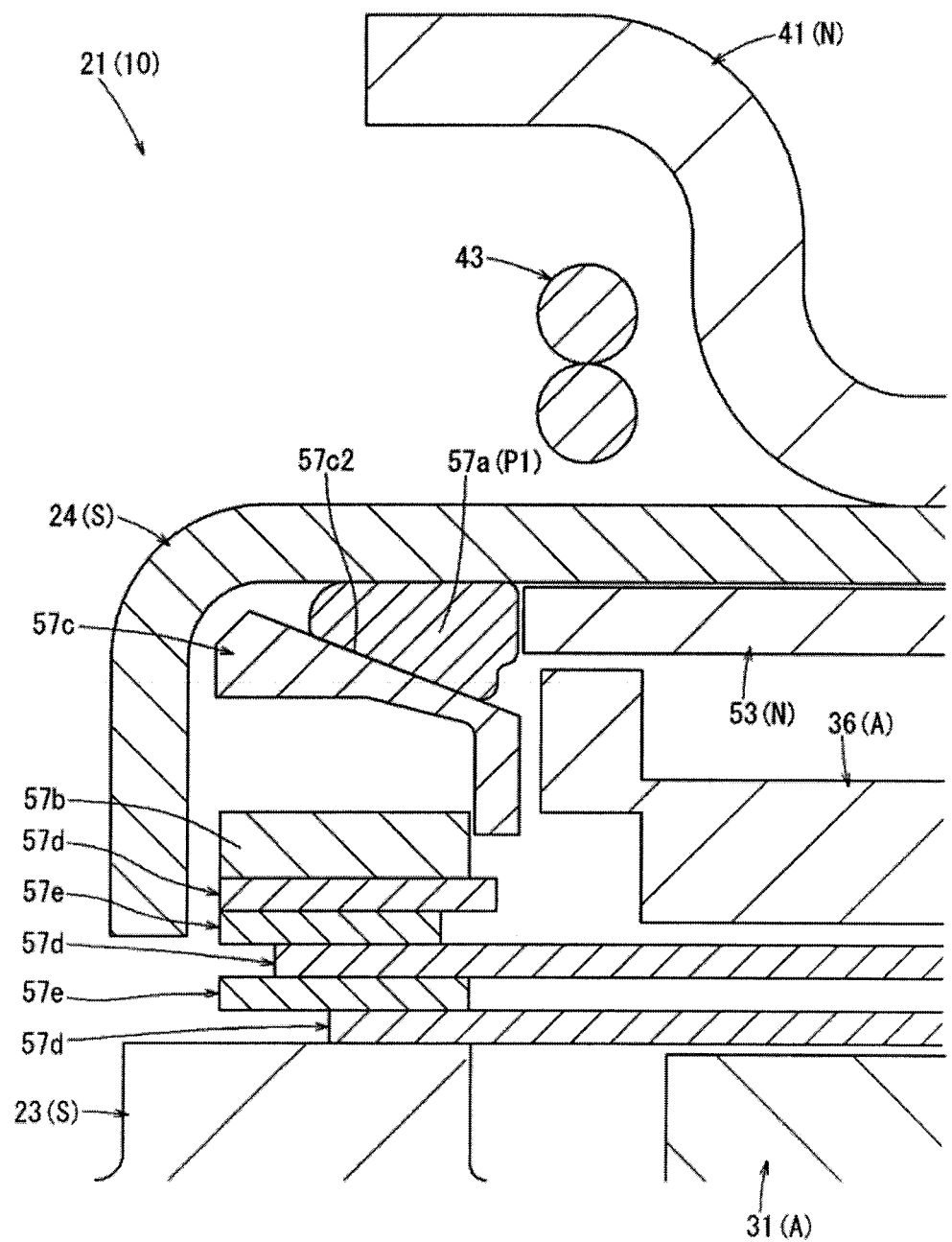
FIG. 38 is an enlarged view of a portion XXXVIII in FIG. 8.

The three clutch portions 57a are set in corresponding inclined concave surfaces 57c2 formed at three places of the right side surface portion of the guide member 57c in the rotational direction. As shown in FIG. 38, each clutch portion 57a is disposed between each inclined concave surface 57c2 formed on the right side surface portion of the guide member 57c and a left side surface of the cover 24 in the thrust direction. Accordingly, each clutch portion 57a is supported by each inclined concave surface 57c2 of the guide member 57c from both sides in the rotational direction so as to be slidable only in the radial direction oblique to the thrust direction along an inclined direction of each inclined concave surface 57c2. The above-described substantially disc-shaped inner lever 53 is disposed on a radially inner side of each clutch portion 57a. Here, the inner lever 53 corresponds to a "rotating cam" of the present disclosure.

As shown in FIG. 9, the inner lever 53 has relief surfaces 53f partially recessed radially inward and rising-up surfaces 53g bulge radially outward at three places of an outer peripheral surface of the inner lever 53 in the circumferential direction. The relief surfaces 53f and rising-up surfaces 53g are arranged in the rotational direction. The relief surfaces 53f and the rising-up surface 53g are formed into arc shapes concentric with each other and drawn around the center of the inner lever 53. A step surface between the relief surface 53f and the rising-up surfaces 53g is an inclined surface 53h that connects the two surfaces in an inclined manner instead of a right angle.

Figure 16:
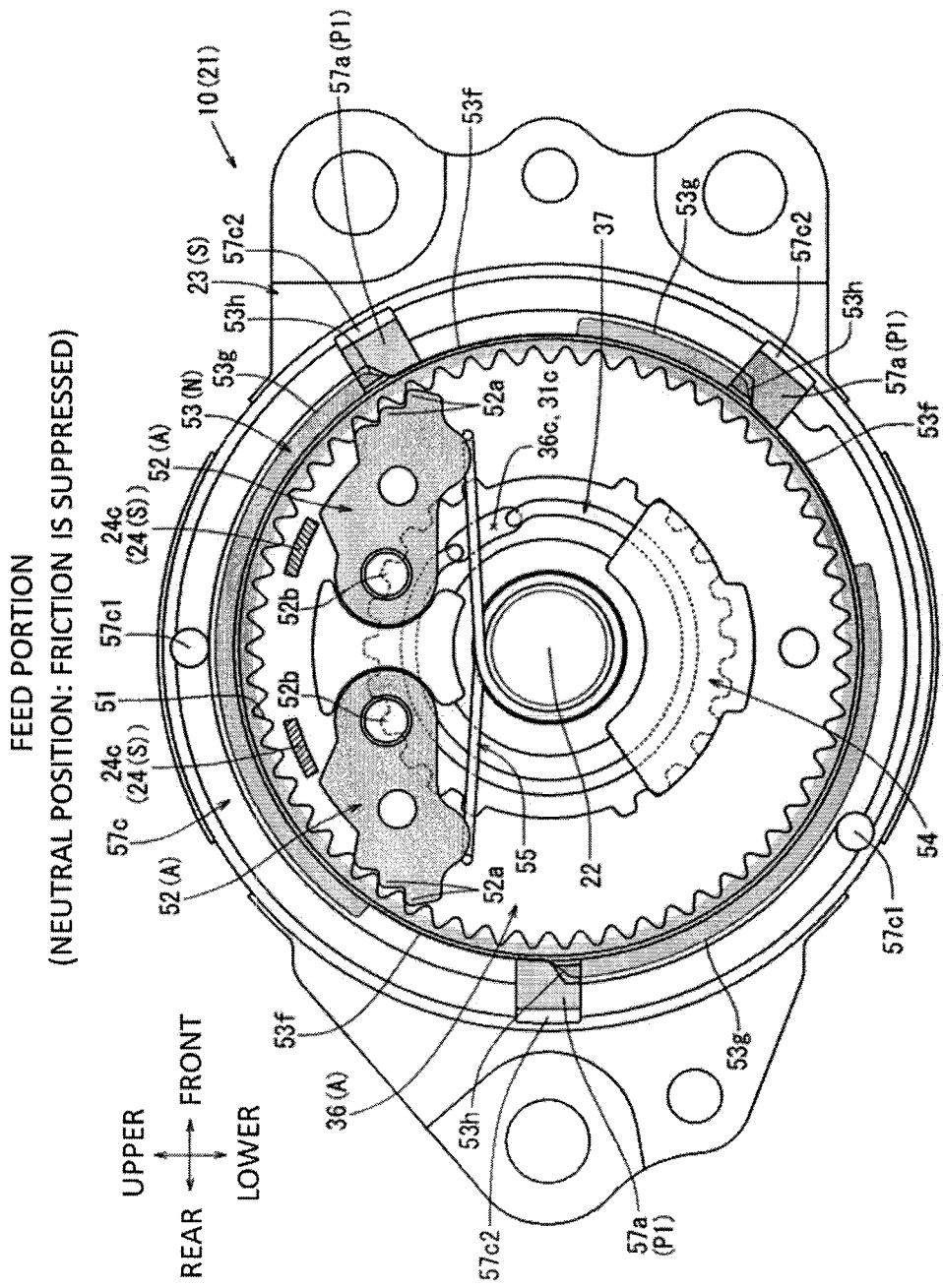
FIG. 16 is a state diagram of a feed portion of the rotation control device at a time when the operation handle is in a neutral position.
Figure 24:
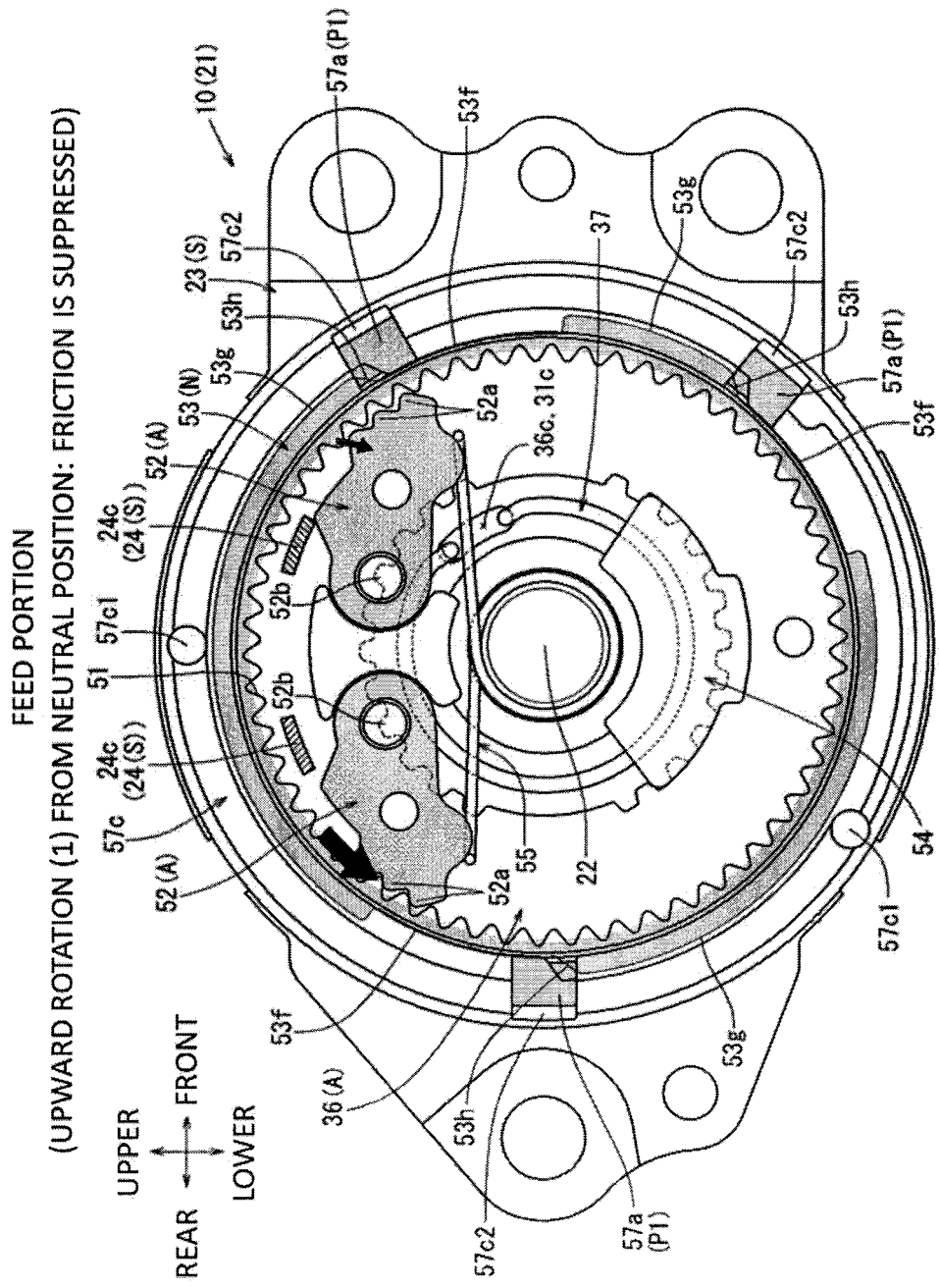
FIG. 24 is a state diagram of the feed portion at a time when the operation handle is pulled up from the neutral position.

As shown in FIGS. 16 and 38, when the inner lever 53 is in the neutral position at which the inner lever 53 is positioned before the operation, each of the clutch portions 57a is located at a boundary with the inclined surface 53h on the corresponding relief surface 53f on the outer peripheral surface of the inner lever 53. As shown in FIG. 24, even if the inner lever 53 is turned from the neutral position in the direction of rotating the output shaft 22 upward, each of the clutch portions 57a slides on the corresponding relief surface 53f of the inner lever 53 and is not changed to a position in the corresponding inclined concave surface 57c2 of the guide member 57c (friction-suppression state P1: see FIG. 38).

Figure 18:
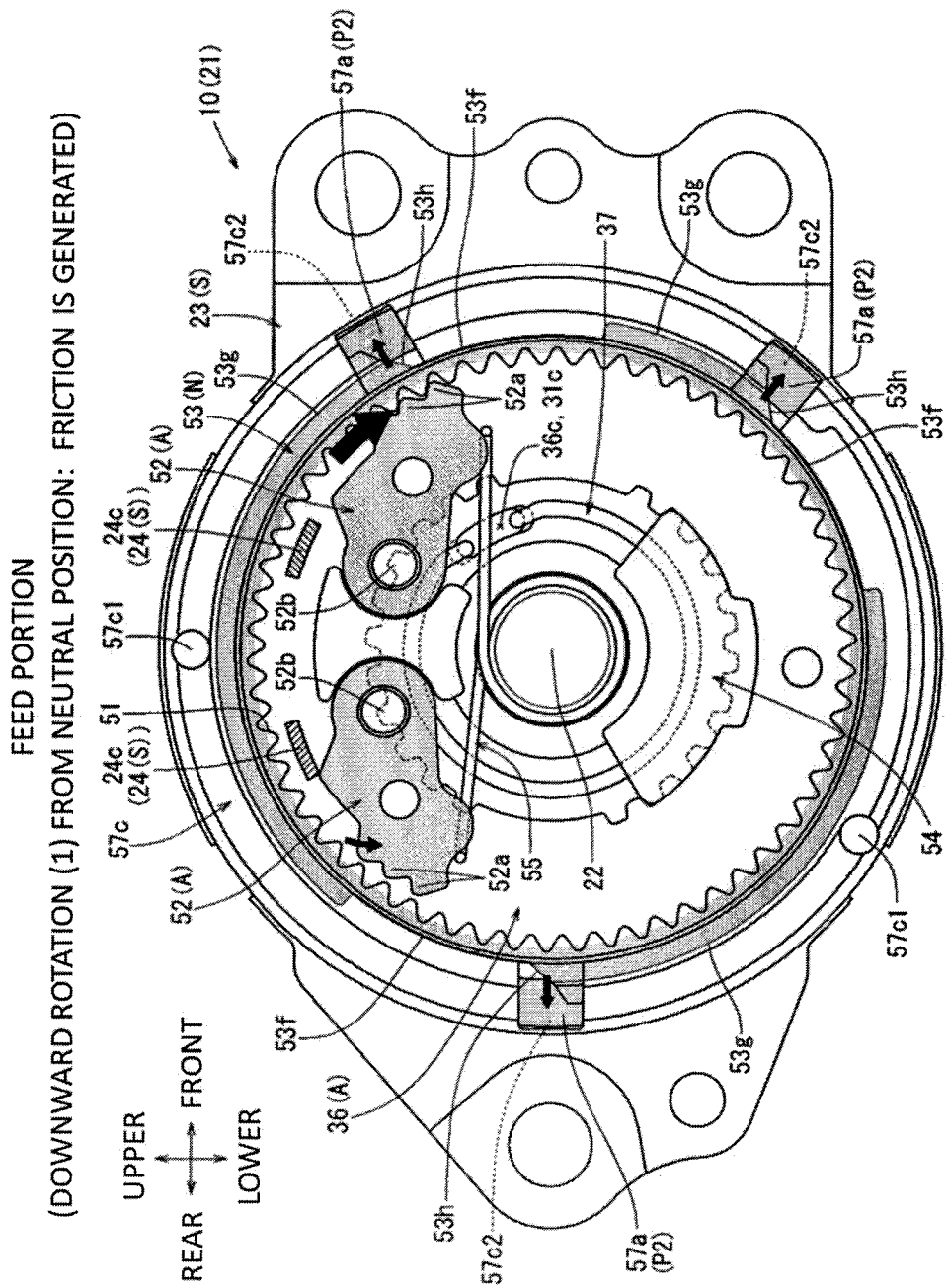
FIG. 18 is a state diagram of the feed portion at a time when the operation handle is pushed down from the neutral position.
Figure 39:
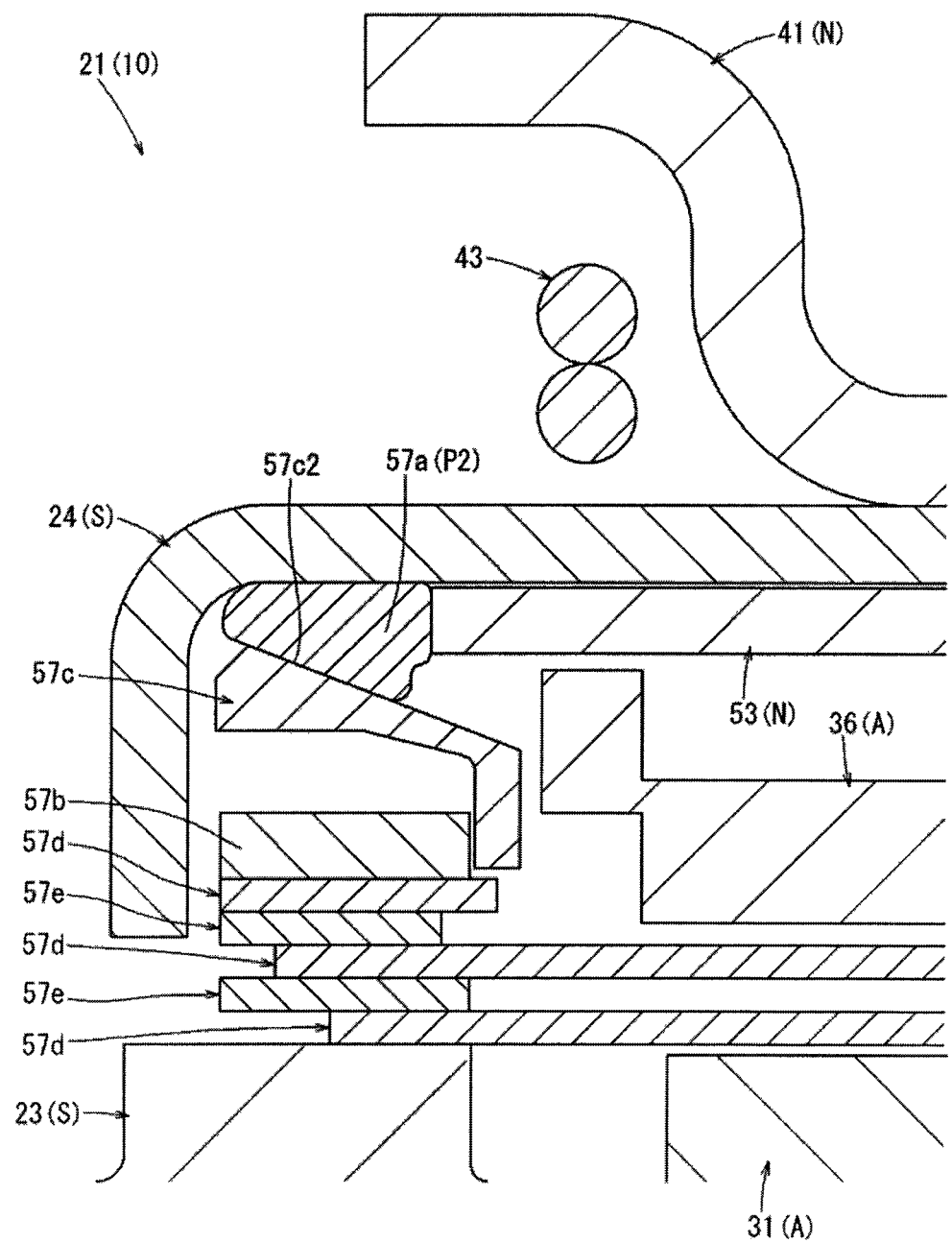
FIG. 39 is a cross-sectional view showing a state in which a friction generating portion is switched to a friction-on state from FIG. 38.

However, as shown in FIG. 18, when the inner lever 53 is turned from the neutral position in the direction of rotating the output shaft 22 downward, each of the clutch portions 57a slides from the corresponding inclined surface 53h of the inner lever 53 onto the rising-up surface 53g and is pushed radially outward along the corresponding inclined concave surface 57c2 of the guide member 57c simultaneously (friction-on state P2: see FIG. 39).

Accordingly, each clutch portion 57a presses the guide member 57c to the left side (thrust direction) and presses the guide member 57c against the leaf spring 57b with a contact point pressed against the left side surface of the inner lever 53 as a fulcrum. The leaf spring 57b pressed to the left side is pressed against the rotating ring 57d provided on the left side of the leaf spring 57b. Further, the pressed rotating ring 57d is pressed against the fixed ring 57e provided on the left side of the rotating ring 57d. The rotating ring 57d is integrally connected to the rotating plate 31 in the rotational direction, and the fixed ring 57e is integrally connected to the base 23 (support member S) in the rotational direction. Therefore, by the above-described pressing, the sliding frictional resistance force is applied to the rotational movement of the rotating plate 31 with respect to the base 23.

Here, the rotating ring 57d corresponds to a "rotating member" of the present disclosure. The fixed ring 57e corresponds to a "fixed member" of the present disclosure.

As shown in FIG. 9, the three rotating rings 57d are arranged in the thrust direction, and the two fixed rings 57e are arranged in the thrust direction so as to be sandwiched between the rotating rings 57d one by one. The rotating ring 57d is assembled to a right side surface portion of the rotating plate 31 so as to be slidable only in the thrust direction. Specifically, each of the left two rotating rings 57d has round-hole-shaped first engaging holes 57d1 formed in pieces which protrude radially inward from the inner peripheral edge portion at two upper-lower places. The respective first engaging holes 57d1 are inserted from the right side into respective round-pin-shaped first engagement pins 31f protruding to the right side from the two corresponding places of the rotating plate 31. Accordingly, the left two rotating rings 57d are assembled in a state in which the left two rotating rings 57d are movable integrally with the rotating plate 31 in the rotational direction and the radial direction, but the left two rotating rings 57d are assembled in a state in which the left two rotating rings 57d are slidable in the thrust direction with respect to the rotating plate 31.

Further, the remaining right rotating ring 57d has round-hole-shaped second engaging holes 57d2 formed in pieces which protrude radially inward from the inner peripheral edge portion at two upper-lower places of the remaining right rotating ring 57d. The second engaging holes 57d2 are inserted from the right side into respective round-pin-shaped second engagement pins 31g protruding to the right side from the two corresponding places of the rotating plate 31. Accordingly, the right rotating ring 57d is also assembled in a state in which the right rotating ring 57d is movable integrally with the rotating plate 31 in the rotational direction and the radial direction, but the right rotating ring 57d is assembled in a state in which the right rotating ring 57d is slidable in the thrust direction with respect to the rotating plate 31.

The first engagement pin 31f and the second engagement pin 31g, which are formed on the rotating plate 31, are formed at positions shifted from each other in the rotational direction. Each second engaging hole 57d2, which is formed in the right rotating ring 57d and is inserted into each second engagement pin 31g, is formed in each crank-shaped piece bent leftward and protruding radially inward from the inner peripheral edge portion of the same rotation ring 57d. With such a configuration, the protruding lengths of the first engaging pin 31f and the second engaging pins 31g protruding rightward from the rotating plate 31 are differentiated and shortened.

On the other hand, the two fixed rings 57e are assembled to an outer peripheral edge portion of the base 23 in a state in which each fixed rings 57e is slidable only in the thrust direction with respect to an outer peripheral edge portion of the base 23. Specifically, an engaging pawl 57e1 protruding from the outer peripheral edge portion at each of four places in the rotational direction of the fixed ring 57e to the left side in a curved shape is inserted from the right side into each engaging groove 23d formed on the outer peripheral edge portion of the base 23 at each of the four corresponding places. Accordingly, the fixed ring 57e is assembled in a state in which the fixed ring 57e is movable integrally with the base 23 in the rotational direction and the radial direction, but the fixed ring 57e is assembled in a state in which the fixed ring 57e is slidable with respect to the base 23 in the thrust direction.

When the rotating ring 57d and the fixed ring 57e are subjected to a pressing force from the right side by the leaf spring 57b, the rotating ring 57d slides leftward with respect to the rotating plate 31 and the fixed ring 57e slides leftward with respect to the base 23. Accordingly, the rotating ring 57d and the fixed ring 57e are pressed against each other in the thrust direction so as to be overlapped. Then, the leftmost rotating ring 57d is pressed against the right side surface on an outer peripheral side of the internal teeth 34 of the base 23. Therefore, when the rotating plate 31 is turned from the above state in the direction of rotating the output shaft 22 downward, the sliding frictional resistance force is applied to the rotational movement of the rotating plate 31 with respect to the base 23 by: a force with which the leaf spring 57b is pressed against the right rotating ring 57d; a force with which each rotating ring 57d and each fixed ring 57e are pressed against each other in the thrust direction; and a force with which the left rotation ring 57d is pressed onto the right side surface of the base 23.

The sliding frictional resistance force can be obtained as a force for rubbing the plurality of rotating rings 57d and fixed rings 57e in a stacked manner by an elastic force exerted by one leaf spring 57b. Therefore, a large sliding frictional resistance force corresponding to the set number of the rotating rings 57d can be obtained by setting one leaf spring 57b. As shown in FIG. 16, when the inner lever 53 is in the neutral position at which the inner lever 53 is positioned before the operation, each clutch portion 57a is set to the friction-suppression state P1 in which the clutch portion 57a is not pressed radially outward by the inner lever 53. In this state, as shown in FIG. 38, although the guide member 57c guiding each clutch portion 57a is not pushed in the thrust direction by each clutch portion 57a, there is a gap T (see FIG. 7) in the thrust direction between the guide member 57c and the left side surface of the cover 24 via each clutch portion 57a.

That is, the guide member 57c is set to have the gap T in the thrust direction between the guide member 57c and the left side surface of the cover 24 even in the friction-suppression state P1, that is, even in the state in which the elastic force in the thrust direction caused by the leaf spring 57b is not affected. Accordingly, in the friction-suppression state P1, the guide member 57c is less likely to generate abnormal noise due to rubbing or hitting against the left side surface of the cover 24. Further, as shown in FIG. 39, even when each clutch portion 57a is pushed outward in the radial direction and switched to the friction-on state P2, each clutch portion 57a is pushed in the thrust direction between the guide member 57c and the left side surface of the cover 24, so that there is the gap T in the thrust direction between the guide member 57c and the left side surface of the cover 24. Accordingly, even in the friction-on state P2, the guide member 57c is less likely to generate abnormal noise due to rubbing or hitting against the left side surface of the cover 24.

As shown in FIG. 10, the guide member 57c has a flange portion 57c3 protruding from the ring-shaped inner peripheral edge of the guide member 57c to the left side in a substantial cylindrical shape. The flange portion 57c3 is set inside the ring of the leaf spring 57b. The flange portion 57c3 supports the leaf spring 57b from the inner peripheral side, and holds the leaf spring 57b in a position concentric with the guide member 57c. The leaf spring 57b is connected to the guide member 57c in a state in which the leaf spring 57b is movable in the rotational direction integrally with the guide member 57c. Specifically, a locking pawl 57b1 protruding radially inward from an inner peripheral edge portion of the plate spring 57b is fitted into a locking hole 57c4 formed at a corresponding place of the flange portion 57c3 of the guide member 57c, so that the leaf spring 57b is connected to the guide member 57c in a state in which the leaf spring 57b is movable in the rotational direction integrally with the guide member 57c. Accordingly, since the leaf spring 57b does not rotate and the frictional resistance force exerted by the leaf spring 57b hardly changes, the operation feeling of the operation handle 20 can be kept constant.

<Operation of Rotation Control Device 21 (Operation Handle 20 is not Operated)>

Hereinafter, a height adjustment operation of the seat cushion 2 performed by the rotation control device 21 is described with reference to FIGS. 16 to 28.

FIGS. 16 and 17 show a state of the neutral position in which the operation handle 20 is not operated, and in which the outer lever 41 and the inner lever 53, which constitute the input member N, are not rotated. At this time, as shown in FIG. 16, the engaging end portion 52a forming the external teeth of the feed pawl 52 is meshed with the internal teeth 51 of the rotation transmission plate 36 by the urging of the torsion spring 55. Further, as shown in FIG. 17, the engaging end portions 32c, 33c respectively forming the external teeth of the pawls 32, 33 are engaged with the internal teeth 34 of the base 23 by the urging of the torsion springs 35. Therefore, the rotation of the rotating plate 31 is locked via the engagement of the pawls 32, 33, and the height of the seat 1 is not changed on a raised side and a lowered side. Further, each clutch portion 57a is located on the corresponding relief surface 53f of the inner lever 53, so that the friction-suppression state P1 that suppresses the occurrence of friction is set.

<Operation of Rotation Control Device 21 (Operation Handle 20 is Pushed Down)>

FIGS. 18 and 21 show a state in which the operation handle 20 is pushed down from the neutral position. At this time, as shown in FIG. 18, the inner lever 53 is rotated in an arrow direction by the rotation of the outer lever 41. As a result, each feed pawl 52 is moved in the same direction. Therefore, the engaging end portion 52a forming the external teeth of the front feed pawl 52 transmits a force to the internal teeth 51 of the rotation transmission plate 36 to push and turn the rotation transmission plate 36 in the arrow direction. At this time, the engaging end portion 52a forming the external teeth of the rear feed pawl 52 is not meshed with the internal teeth 51 of the rotation transmission plate 36. That is, with the rotation of the rotation transmission plate 36, the rear feed pawl 52 rides on the rising-up portion 24c on the rear side, and the engaging end portion 52a is moved out of mesh with the internal teeth 51.

Figure 19:
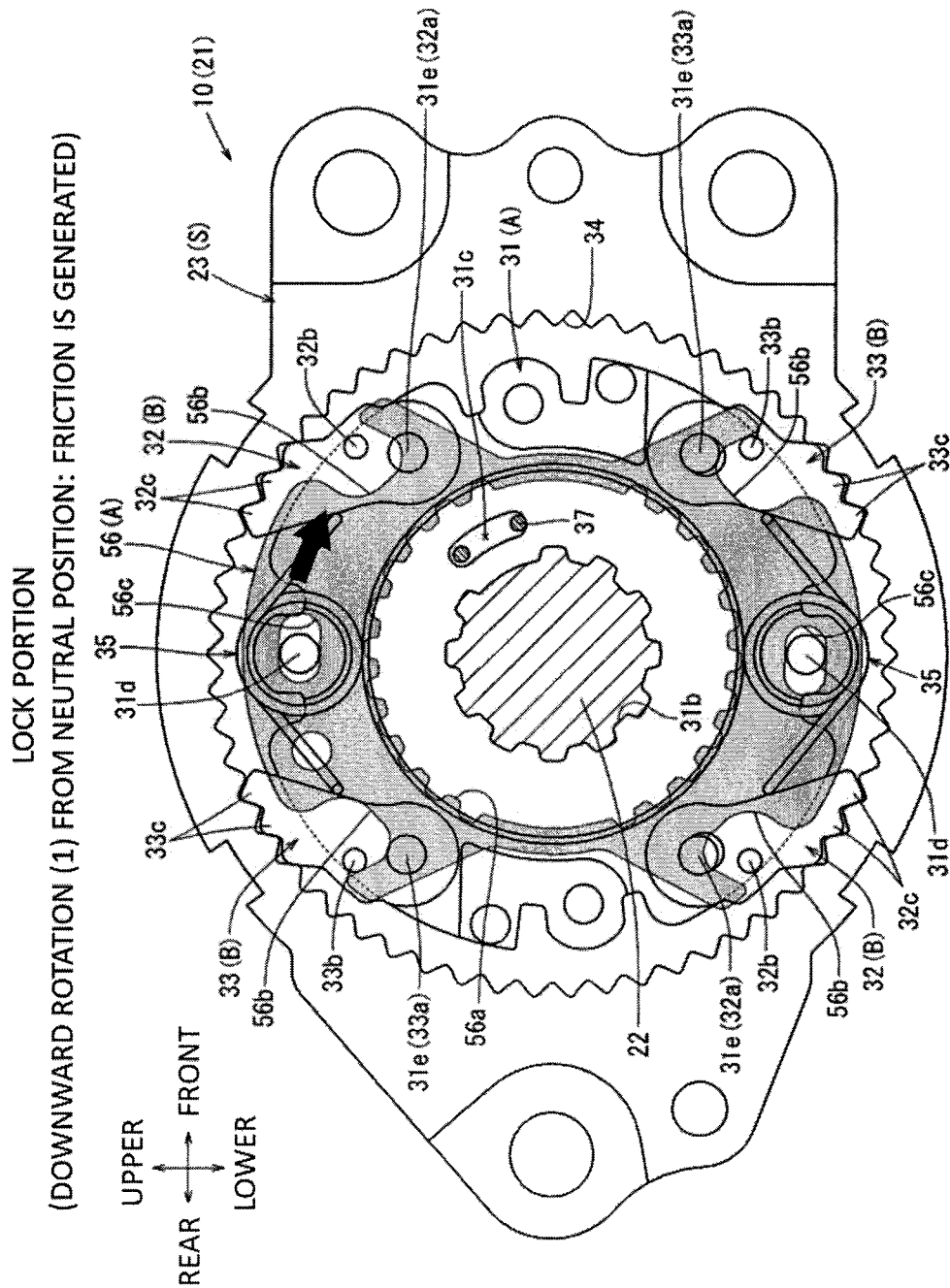
FIG. 19 is a state diagram of the lock portion at a time when a clutch portion is meshed with a friction ring by pushing down the operation handle from the neutral position.
Figure 20:
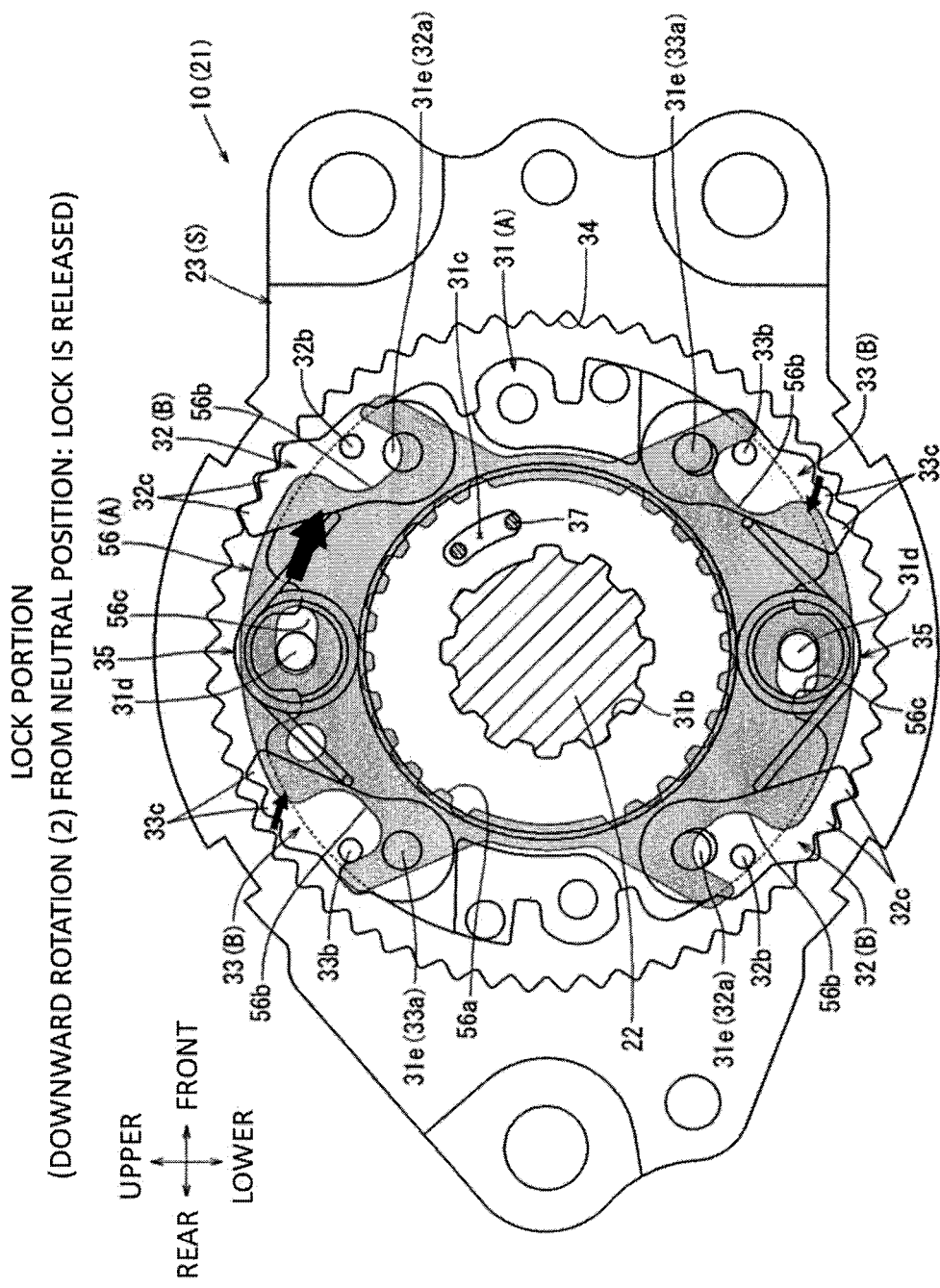
FIG. 20 is a state diagram of the lock portion at a time when a lock pawl is unlocked by pushing down the operation handle from the neutral position.

When the inner lever 53 is turned as described above, each clutch portion 57a rides on the corresponding rising-up surface 53g of the inner lever 53 and is switched to the friction-on state P2. At this time, as shown in FIG. 19, the pawls 32, 33 are still held in a state of being meshed with the internal teeth 34 of the base 23. Then, when the rotation transmission plate 36 is further turned by the inner lever 53 from the above state, as shown in FIG. 20, the control hole 56b of the control plate 56 integrated with the rotation transmission plate 36 is engaged with the pin 33b of the two pawls 33 at a diagonal position to push and turn the engaging end portion 33c of each pawl 33 inward in the radial direction such that the engaging end portion 33 is moved out of mesh with the internal teeth 34 of the base 23.

Specifically, when the rotation transmission plate 36 is in the neutral position by the urging of the torsion spring 37 with respect to the rotation plate 31 as shown in FIG. 17, the four control holes 56b formed in the control plate 56 are positioned as follows with respect to the pins 32b, 33b of the pawls 32, 33. That is, the two corresponding control holes 56b, into which the pins 32b of the two pawls 32 in the diagonal positions are inserted, are positioned at positions deviated in the rotational direction with inclined side surfaces facing the rotational direction of the pins 32b approaching an illustrated counterclockwise direction. Further, the two corresponding control holes 56b, into which the pins 33b of the two pawls 33 in the diagonal positions different from the above are inserted, are positioned at positions deviated in the rotational direction with inclined side surfaces facing the rotational direction of the pins 33b approaching an illustrated clockwise direction.

With such a configuration, by turning the rotation transmission plate 36 from the neutral position described above in the clockwise direction as shown in FIG. 20, the inclined side surfaces of the two control holes 56b, into which the pins 33b of the two pawls 33 in the diagonal positions are inserted, are made to abut on the two pins 33b, and are made to slide the pins 33b inward in the radial direction along the inclined side surfaces of the control holes 56b with progress of the rotation. Then, the engaging end portion 33c of each pawl 33 is moved out of mesh with the internal teeth 34 of the base 23 while keeping the engaging end portions 32c of the other two pawls 32 in a state of being meshed with the internal teeth 34 of the base 23.

Accordingly, the lock state of the rotating plate 31 in the downward rotational direction is released. Thereafter, when the protrusion 31d of the rotating plate 31 abuts on the end portion of the engagement long hole 56c of the control plate 56, the rotation of the rotation transmission plate 36 is in a state of being transmitted to the rotating plate 31. Therefore, as shown in FIG. 21, the rotating plate 31 is feeding-rotated with respect to the base 23 in the illustrated clockwise direction in which the rotation transmission plate 36 is feeding-rotated, so that the output shaft 22 integrated with the rotating plate 31 can be integrally fed and rotated in the same direction. At this time, the engaging end portions 32c of the two pawls 33 at the other diagonal positions are not meshed with the internal teeth 34 of the base 23. That is, in this state, the teeth of the engaging end portion 32c receive a load in a normal direction of the teeth of the internal teeth 34 and are moved in a direction to release meshing. Therefore, when the rotating plate 31 rotates, the engaging end portions 32c of the two pawls 32 are slid so as to slide on the internal teeth 34 of the base 23.

Figure 22:
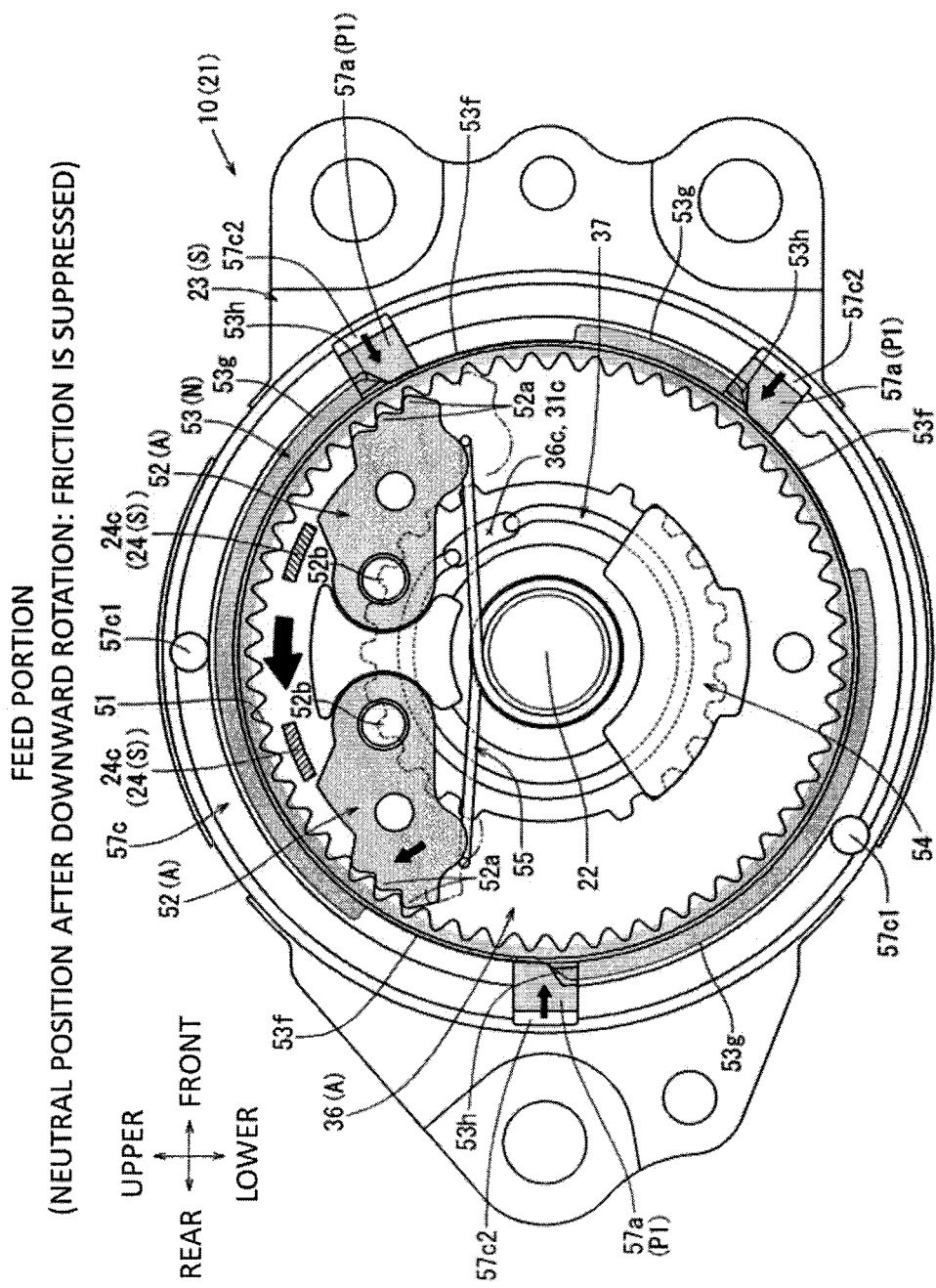
FIG. 22 is a state diagram of the feed portion at a time when the operation handle is returned from a pushed-down position to the neutral position.
Figure 23:
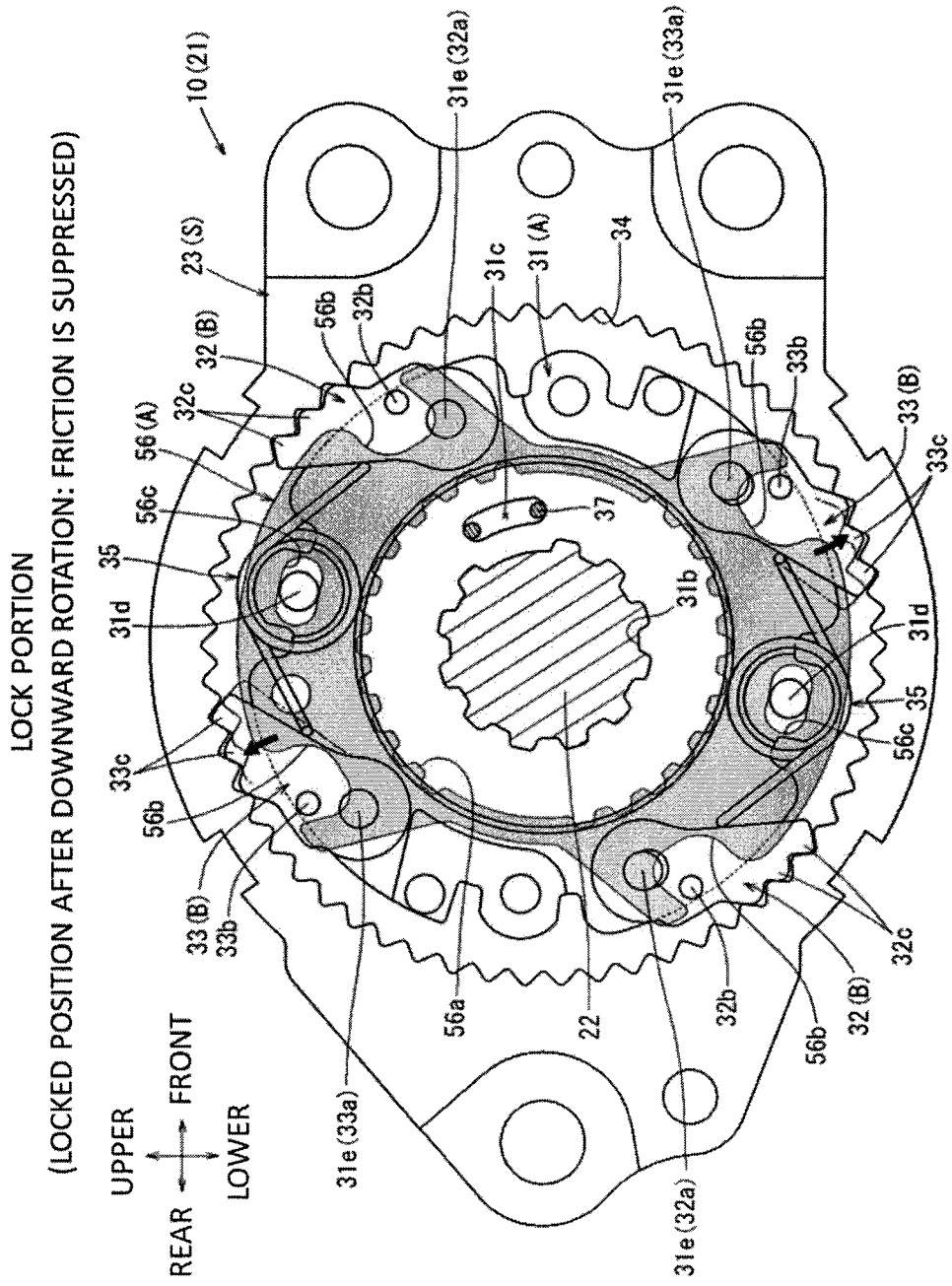
FIG. 23 is a state diagram of the lock portion at the time when the operation handle is returned from the pushed-down position to the neutral position.

When the feeding-rotation of the rotation plate 31 by the rotation transmission plate 36 is stopped and the operation handle 20 is returned to the neutral position as shown in FIG. 22, for the two pawls 33 which are released at the diagonal positions, as shown in FIG. 23, a release holding state of each pawl 33 is released by each control hole 56b of the control plate 56, the control plate 56 (rotation transmission plate 36) is returned to the neutral position by the urging action of the torsion spring 37 with respect to the rotating plate 31, and the engaging end portions 33c are meshed with the internal teeth 34 of the base 23. Accordingly, the output shaft 22, which rotates integrally with the rotating plate 31, is returned to the state in which the rotation of the output shaft 22 with respect to the base 23 is stopped. When the operation handle 20 is returned to the neutral position, as shown in FIG. 16, each clutch portion 57a is returned from the rising-up surface 53g of the inner lever 53 onto the relief surface 53f, and becomes the friction-suppression state P1.

<Operation of Rotation Control Device 21 (Operation Handle 20 is Pulled Up)>

FIGS. 24 and 26 show a state in which the operation handle 20 is pulled up from the neutral position. At this time, as shown in FIG. 24, the inner lever 53 is rotated in the arrow direction by the rotation of the outer lever 41. As a result, each feed pawl 52 is moved in the same direction. Therefore, the engaging end portion 52a forming the external teeth of the rear feed pawl 52 transmits a force to the internal teeth 51 of the rotation transmission plate 36 to push and turn the rotation transmission plate 36 in the arrow direction. At this time, the engaging end portion 52a forming the external teeth of the front feed pawl 52 is not meshed with the internal teeth 51 of the rotation transmission plate 36. That is, with the rotation of the rotation transmission plate 36, the front feed pawl 52 rides on the rising-up portion 24c at the front side, and the engaging end portion 52a is moved out of mesh with the internal teeth 51.

Figure 25:
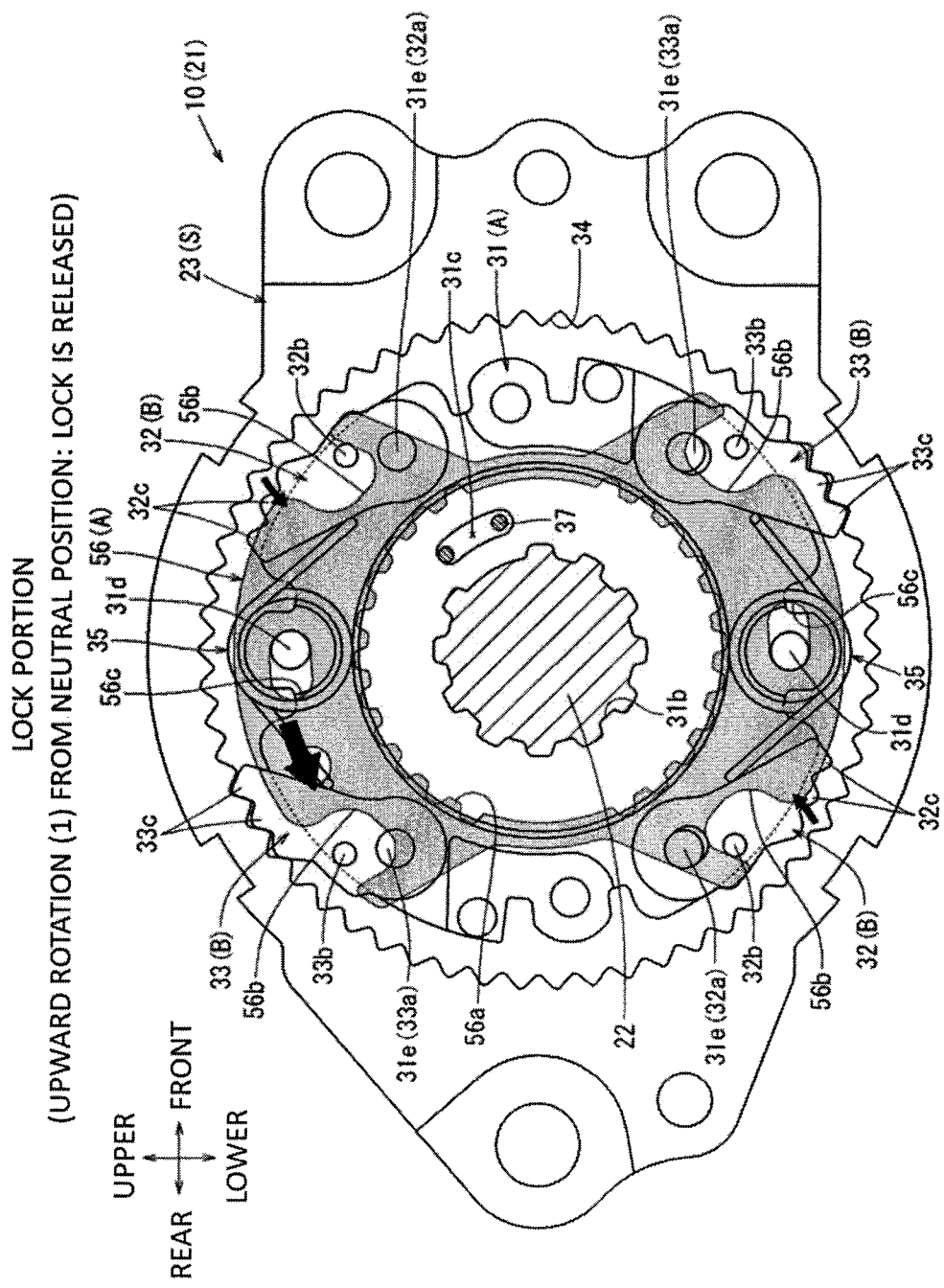
FIG. 25 is a state diagram of the lock portion at a time when the lock pawl is unlocked by pulling up the operation handle from the neutral position.

When the inner lever 53 is turned as described above, each clutch portion 57a slides on the relief surface 53f of the inner lever 53 and is held in the friction-suppression state P1. Then, by the rotation of the rotation transmission plate 36, as shown in FIG. 25, the control holes 56b of the control plate 56 integrated with the rotation transmission plate 36 are engaged with the pins 32b of the two pawls 32 at the diagonal positions while leaving the engaging end portions 33c of the two pawls 33 at other diagonal positions engaged with the internal teeth 34 of the base 23, and the engaging end portions 32c of the two pawls 32 are pushed and turned inward in the radial direction so as to be moved out of mesh with the internal teeth 34 of the base 23.

Accordingly, the locked state of the rotating plate 31 in the ascending rotational direction is released. Thereafter, when the protrusion 31d of the rotating plate 31 abuts on the end portion of the engagement long hole 56c of the control plate 56, the rotation of the rotation transmission plate 36 is in the state of being transmitted to the rotating plate 31. Therefore, as shown in FIG. 26, the rotating plate 31 is feeding-rotated with respect to the base 23 in the illustrated counterclockwise direction in which the rotation transmission plate 36 is feeding-rotated, so that the output shaft 22 integrated with the rotating plate 31 can be integrally fed and rotated in the same direction. At this time, the engaging end portions 33c of the two pawls 33 at the other diagonal positions are not meshed with the internal teeth 34 of the base 23. That is, in this state, the teeth of the engaging end portion 33c receive a load in the normal direction of the internal teeth 34 and are moved in the direction to release meshing. Therefore, when the rotating plate 31 rotates, the engaging end portions 33c of the two pawls 33 are slid so as to slide on the internal teeth 34 of the base 23.

Figure 27:
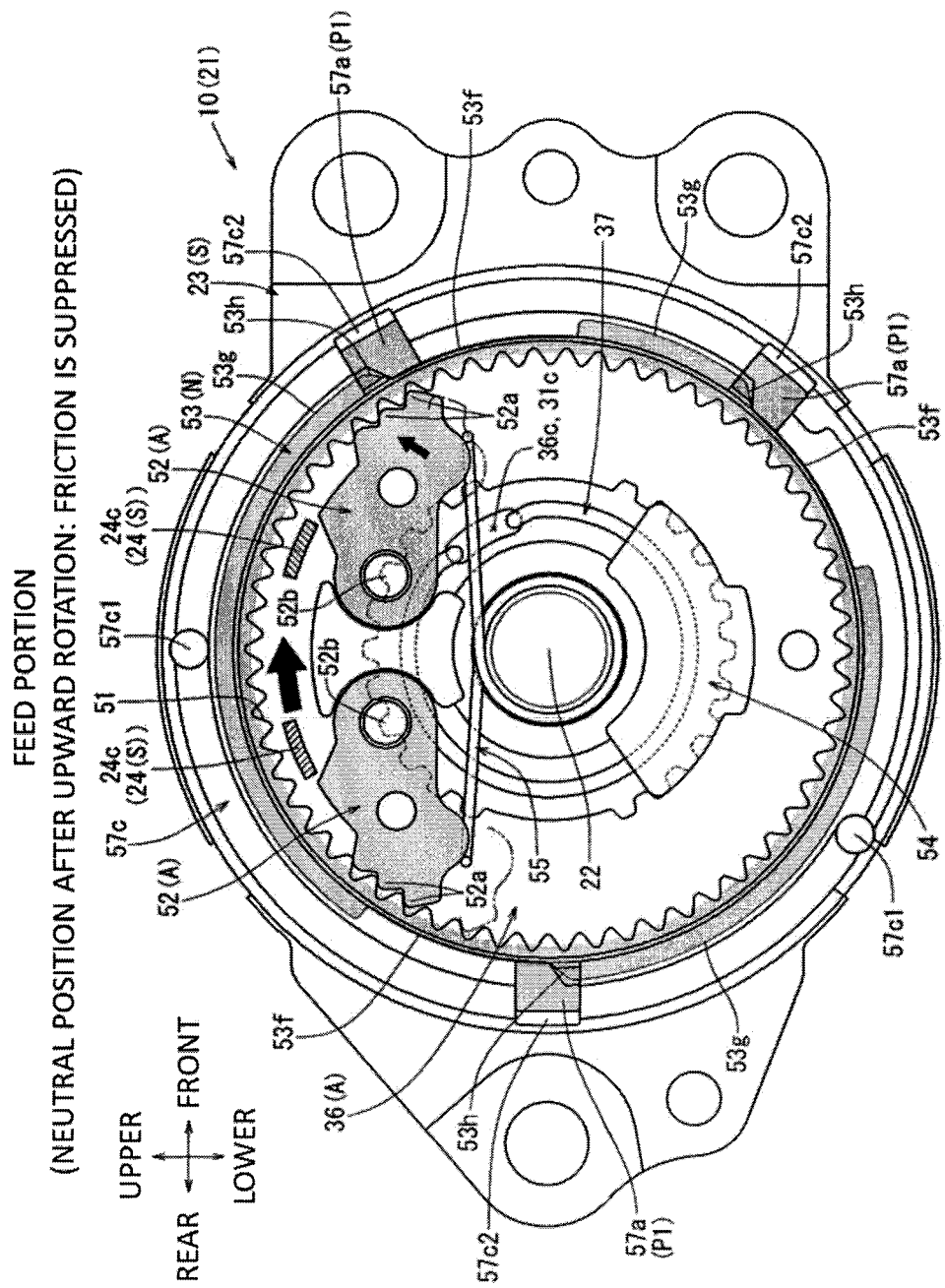
FIG. 27 is a state diagram of the feed portion at a time when the operation handle is returned from a pulled-up position to the neutral position.
Figure 28:
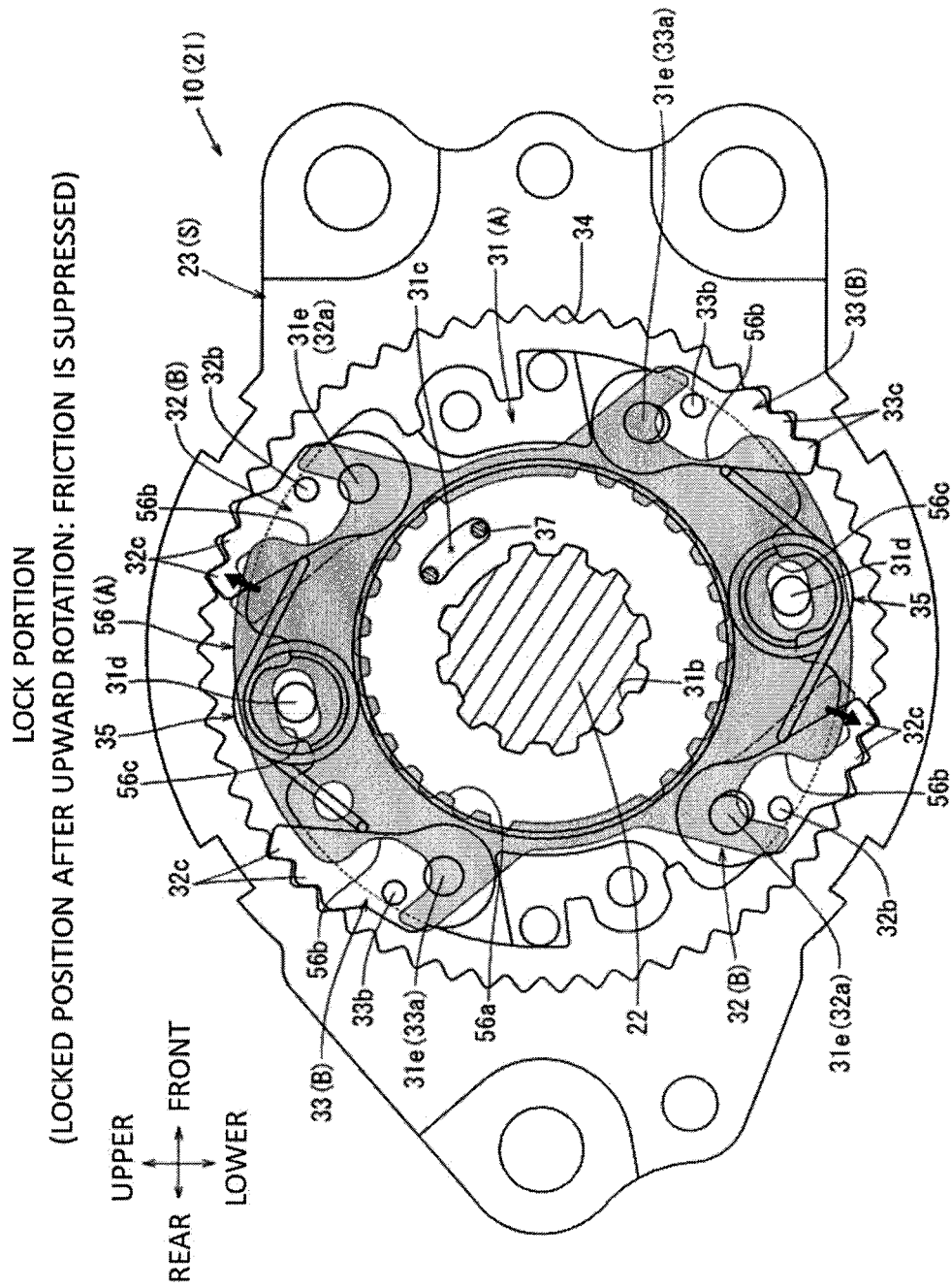
FIG. 28 is a state diagram of the lock portion at the time when the operation handle is returned from the pulled-up position to the neutral position.

When the feeding-rotation of the rotation plate 31 by the rotation transmission plate 36 is stopped and the operation handle 20 is returned to the neutral position as shown in FIG. 27, for the two pawls 32 which are released at the diagonal positions, as shown in FIG. 28, the release holding state of each pawl 32 is released by each control hole 56b of the control plate 56, the control plate 56 (rotation transmission plate 36) is returned to the neutral position by the urging of the torsion spring 37 with respect to the rotating plate 31, and the engaging end portions 32c are meshed with the internal teeth 34 of the base 23. Accordingly, the output shaft 22 integrated with the rotating plate 31 is returned to the state in which the rotation of the output shaft 22 with respect to the base 23 is stopped.

When the engaging end portions 32c, 33c of the pawls 32, 33 are engaged with the internal teeth 34 of the base 23 as shown in FIG. 17, each of the pins 32b, 33b is positioned at an intermediate part in the radial direction between the protrusion 31e, which is the rotation center of each of the pawls 32, 33 with respect to the rotating plate 31, and a tooth tip of the internal teeth 34. Accordingly, the pawls 32, 33 can be efficiently rotated inward in the radial direction with respect to the rotational movement amount of the rotation transmission plate 36, and can be moved out of mesh with the internal teeth 34 of the base 23 (see FIGS. 20 and 25). Therefore, it is possible to shorten a stroke required for the unlocking operation of each of the pawls 32, 33 accompanying the operation of the operation handle 20.

<Operation of Rotation Control Device 21>

As described above, when the operation handle 20 is pushed down, the seat 1 is lowered by the movement amount corresponding to the operation. By repeating the pushed-down operation, the seat 1 can be adjusted to a desired height. Conversely, when the operation handle 20 is pulled up, the seat 1 is similarly raised by the movement amount corresponding to the operation. By repeating the pulled-up operation, the seat 1 can be adjusted to a desired height. When the seat 1 reaches the lower limit position or the upper limit position by the above operation, the further rotation of the output shaft 22 is stopped as shown in FIG. 32 or 33.

SUMMARY

In summary, the lifter device 10 according to the first embodiment has the following configuration. That is, a lifter device (10) includes: an output shaft (22) configured to rotate by receiving transmission of rotational power from an operation handle (20) and configured to raise and lower a seat (1); a support member (S) configured to support the output shaft (22) such that the output shaft (22) is rotatable; an input member (N) coupled to the operation handle (20) and configured to be operated to rotate around an axis of the output shaft (22); a feed portion (A) configured to transmit forward and reverse rotation of the input member (N) to the output shaft (22); a lock portion (B) configured to lock the rotation of the output shaft (22) with respect to the support member (S); and a friction generating portion (57) configured to apply a frictional force to the rotation of the output shaft (22).

The friction generating portion (57) includes: an elastic body (57b) provided between the output shaft (22) and the support member (S); a rotating cam (53) connected to the input member (N); a rotating member configured to rotate integrally with the output shaft (22); a clutch portion (57a) configured to be supported by the support member (S), configured to be pushed in a radial direction by rotation of the rotating cam (53), and configured to press the elastic body (57b) in a thrust direction between the clutch portion (57a) and the rotating member (57d) to generate friction; and a fixed member (57e) configured to be supported by the support member (S) and arranged with the rotating member (57d) in the thrust direction.

The rotating cam (53) is a switching structure of switching to: a friction-suppression state (P1), in which generation of friction caused by the elastic body (57b) is suppressed, by not pushing the clutch portion (57a) in the radial direction when the operation handle (20) is in a neutral position and when the operation handle (20) is turned from the neutral position in a direction of raising the seat (1); and a friction-on state (P2), in which friction caused by the elastic body (57b) is generated, by pushing the clutch portion (57a) in the radial direction when the operation handle (20) is turned from the neutral position in a direction of lowering the seat (1). In the friction-on state (P2), the rotating member (57d) is pressed against the fixed member (57e) and friction caused by rotation of the rotating member with respect to the fixed member (57e) is generated.

According to the above configuration, when the operation handle (20) is not operated and when the operation handle (20) is operated in the direction of raising the seat (1), the friction generating portion (57) is brought into the friction-suppression state (P1). Therefore, an operation load is not increased when the seat (1) is raised by the operation handle (20). Further, when the operation handle (20) is returned to the neutral position, the lock portion (B) can be smoothly locked without being affected by the friction.

On the other hand, when the operation handle (20) is operated in the direction of lowering the seat (1), the friction generating portion (57) is brought into the friction-on state (P2). Therefore, it is possible to appropriately prevent the output shaft (22) from sliding and rotating due to self-weight applied to the seat (1). Further, since the clutch portion (57a) presses the elastic body (57b) between the clutch portion (57a) and the rotating member (57d) in the thrust direction, the turning of the operation handle (20) is hardly hindered when the operation handle (20) is returned to the neutral position. Further, since the rotating member (57d) pressed by the elastic body (57b) slides while being pressed against the fixed member (57e), a high sliding frictional resistance force can be obtained without increasing an elastic force of the elastic body (57b).

The "friction-suppression state" is a state including a state in which no friction is generated and a state in which friction smaller than that in the friction on state is generated. If no friction is generated in the friction-suppression state, the operation load is not increased when the seat is raised by the operation handle. Further, when the operation handle is returned to the neutral position, the lock portion can be smoothly locked without being affected by the friction. On the other hand, if friction smaller than that in the friction-on state is generated in the friction-suppression state, the friction change from the friction-on state can be reduced, and an operation feeling of the operation handle can be easily kept constant.

A plurality of the rotating members (57d) are provided so as to sandwich the fixed member (57e) in the thrust direction, and each of the rotating members (57d) is assembled so as to be movable only in the thrust direction with respect to the output shaft (22). The fixed member (57e) is assembled so as to be movable only in the thrust direction with respect to the support member (S).

According to the above configuration, a contact area of the rotating member (57d) with the fixed member (57e) can be increased, and a high sliding frictional resistance force can be obtained without increasing the elastic force of the elastic body (57b).

Further, a plurality of the fixed members (57e) are provided so as to sandwich at least one rotating member of the plurality of rotating members (57d) in the thrust direction.

According to the above configuration, the contact area of the rotating member (57d) with the fixed member (57e) can be further increased, and a high sliding frictional resistance force can be obtained without increasing the elastic force of the elastic body (57b).

Other Embodiments

Although the embodiment of the present disclosure has been described above using one embodiment, the present disclosure can be implemented in various forms described below in addition to the above embodiment.

1. The lifter device of the present disclosure can be widely applied to a seat provided in a vehicle other than an automobile, such as a railway, and other types of conveyance such as an aircraft and a marine vessel. Further, the lifter device of the present disclosure can be widely applied to non-vehicle seats installed in facilities such as movie theaters.

2. The elastic body configuring the friction generating portion does not necessarily need to be formed of an annular member, but may be formed of pieces (small pieces) dispersely provided at one or more places in the rotational direction. Further, the elastic body may be made of a material other than metal, such as rubber or resin. Further, the elastic body may be configured to be attached to the guide member when there is a guide member configured to support the clutch portion, but may be configured to be attached to a support member or a rotating member configured to rotate integrally with the output shaft.

3. The clutch portion may be indirectly supported by the support member through the guide member supported to be movable only in the thrust direction with respect to the support member, but may be configured to be directly supported by the support member. The clutch portion may be provided at one, two, or four or more places in the rotational direction.

4. The rotating member and the fixed member may each be constituted by one sheet. The alignment of the rotating member and the fixed member may be such that the fixed member is pressed against the rotating member under the pressing force of the elastic body.

It is preferable that the rotating member is supported so as to be integrated with the output shaft in the rotational direction and slidable only in the thrust direction, and the rotating member may be configured to be supported in the thrust direction with respect to the output shaft so as to be bent in the thrust direction and pressed against the fixed member by the elastic force received from the elastic body. It is preferable that the fixed member is also supported so as to be integrated with the support member in the rotational direction and slidable only in the thrust direction, and the fixed member may also be configured to be supported in the thrust direction with respect to the support member such that the rotating member is bent when being pressed in the thrust direction and is pressed against a member on the back side (the rotating member or the support member).

5. A friction-suppression state of the friction generating portion may be a state in which friction is not generated, in addition to a state in which friction smaller than the friction-on state is generated.

What is claimed is:

1. A lifter device comprising:
   an output shaft configured to rotate by receiving transmission of rotational power from an operation handle and configured to raise and lower a seat;
   a support member configured to support the output shaft such that the output shaft is rotatable;
   an input member coupled to the operation handle and configured to be operated to rotate around an axis of the output shaft;
   a feed portion configured to transmit forward and reverse rotation of the input member to the output shaft;
   a lock portion configured to lock the rotation of the output shaft with respect to the support member; and a friction generating portion configured to apply a frictional force to the rotation of the output shaft, the friction generating portion including:
  an elastic body provided between the output shaft and the support member;
  a rotating cam forming part of the input member;
  a rotating member configured to rotate integrally with the output shaft;
  a clutch portion configured to be supported by the support member, configured to be pushed in a radial direction by rotation of the rotating cam, and configured to press the elastic body in a thrust direction between the clutch portion and the rotating member to generate friction; and
  a fixed member configured to be supported by the support member and arranged with the rotating member in the thrust direction,
wherein the rotating cam is a switching structure of switching to:
  a friction-suppression state, in which generation of friction caused by the elastic body is suppressed, by not pushing the clutch portion in the radial direction when the operation handle is in a neutral position and when the operation handle is turned from the neutral position in a direction of raising the seat; and
  a friction-on state, in which friction caused by the elastic body is generated, by pushing the clutch portion in the radial direction when the operation handle is turned from the neutral position in a direction of lowering the seat,
wherein, in the friction-on state, the rotating member is pressed against the fixed member and friction caused by rotation of the rotating member with respect to the fixed member is generated, and
wherein a plurality of the rotating members, including the rotating member, are configured to sandwich the fixed member in the thrust direction.

2. The lifter device according to claim 1,
wherein each of the rotating members is assembled so as to be movable only in the thrust direction with respect to the output shaft, and
wherein the fixed member is assembled so as to be movable only in the thrust direction with respect to the support member.

3. The lifer device according to claim 2,
wherein a plurality of the fixed members are provided so as to sandwich at least one rotating member of the plurality of the rotating members, including the fixed member, in the thrust direction.

* * * * *